US 8,375,216 B2
Feb. 12, 2013

(12) United States Patent
Mizuno

(54) DOCUMENT VERIFICATION APPARATUS AND METHOD

(75) Inventor: Takafumi Mizuno, Higashimurayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1389 days.

(21) Appl. No.: 11/836,367

(22) Filed: Aug. 9, 2007

(65) Prior Publication Data

US 2008/0120505 A1 May 22, 2008

(30) Foreign Application Priority Data

Nov. 21, 2006 (JP) ................................ 2006-314811

(51) Int. Cl.
*H04L 9/32* (2006.01)

(52) U.S. Cl. ........ 713/176; 713/178; 713/194; 713/187; 726/26; 726/27; 726/30; 382/124; 380/246

(58) Field of Classification Search ................. 713/176, 713/180
See application file for complete search history.

(56) References Cited

U.S. PATENT DOCUMENTS

| | | | | | |
|---|---|---|---|---|---|
| 5,475,205 | A | * | 12/1995 | Behm et al. ................... | 235/375 |
| 5,606,609 | A | * | 2/1997 | Houser et al. ................. | 713/179 |
| 5,818,955 | A | * | 10/1998 | Smithies et al. .............. | 382/115 |
| 6,928,548 | B1 | * | 8/2005 | Hale et al. ..................... | 713/187 |
| 6,948,069 | B1 | * | 9/2005 | Teppler ........................ | 713/178 |
| 7,024,558 | B1 | * | 4/2006 | Satake .......................... | 713/176 |
| 7,051,206 | B1 | * | 5/2006 | Giest et al. ................... | 713/176 |
| 7,502,934 | B2 | * | 3/2009 | Dietl ............................. | 713/176 |
| 7,523,315 | B2 | * | 4/2009 | Hougaard et al. ............ | 713/176 |
| 7,552,335 | B2 | * | 6/2009 | Iwamura ....................... | 713/176 |
| 7,590,852 | B2 | * | 9/2009 | Hatter et al. .................. | 713/176 |
| 7,904,722 | B2 | * | 3/2011 | Sudia et al. ................... | 713/176 |
| 8,086,859 | B2 | * | 12/2011 | Pavlicic ........................ | 713/176 |
| 2002/0108044 | A1 | * | 8/2002 | Miyazaki et al. ............. | 713/180 |
| 2003/0028774 | A1 | * | 2/2003 | Meka ............................ | 713/176 |
| 2003/0126444 | A1 | * | 7/2003 | Wakao et al. ................. | 713/176 |
| 2003/0188180 | A1 | * | 10/2003 | Overney ....................... | 713/193 |
| 2004/0215960 | A1 | * | 10/2004 | Wakao et al. ................. | 713/161 |
| 2005/0076215 | A1 | * | 4/2005 | Dryer ........................... | 713/170 |
| 2005/0166052 | A1 | * | 7/2005 | Khormaei et al. ............ | 713/176 |
| 2006/0179320 | A1 | * | 8/2006 | Berringer et al. ............ | 713/180 |

FOREIGN PATENT DOCUMENTS

| | | |
|---|---|---|
| JP | 2003-216601 A | 7/2003 |
| JP | 2005-303657 A | 10/2005 |
| JP | 2006-235885 A | 9/2006 |

OTHER PUBLICATIONS

Ming Jiang, Robust Document Image Authentication, Jul. 2, 2007, IEEE, vol. 7, pp. 2-3.*

* cited by examiner

*Primary Examiner* — Nathan Flynn
*Assistant Examiner* — Viral Lakhia
(74) *Attorney, Agent, or Firm* — Canon USA, Inc., IP Division

(57) ABSTRACT

Determination is executed as to whether an electronic document has been edited after addition of a second signature added after addition of a first signature. When it is determined that editing is made after the addition of the second signature, a verification result of the electronic document is output without determining whether editing is made after the addition of the first signature. If it is determined that editing is not made after the addition of the second signature, determination is executed as to whether editing is made after the addition of the first signature and the verification result of the electronic document is output based on an obtained determination result.

3 Claims, 26 Drawing Sheets

FIG. 2

| CERTIFICATE | CERTIFICATE STATUS | CERTIFICATE-USING DOCUMENT |
|---|---|---|
| A | NOT YET VERIFIED | DOCUMENT M, DOCUMENT X |
| B | VALID | DOCUMENT S, DOCUMENT T |
| C | INVALID | DOCUMENT P |
| D | NOT YET VERIFIED | DOCUMENT X |
| ⋮ | ⋮ | ⋮ |

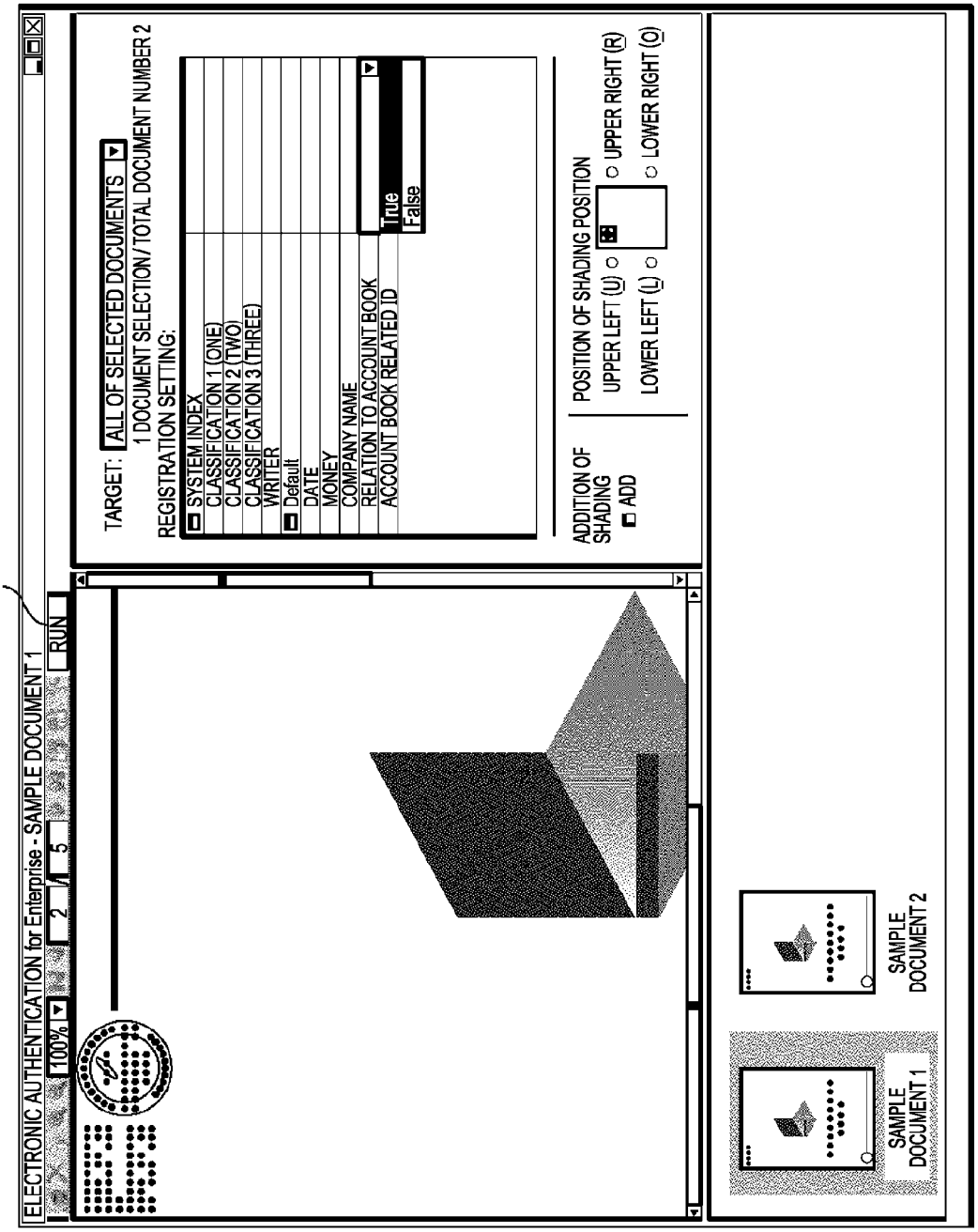

FIG. 9C

Document Manager

SEARCH RESULT
0—10 DOCUMENTS

| DOCUMENT NAME | TAMPER | SIGNATURE | VALID TERM | ASSURANCE TERM | CLASSIFICATION |
|---|---|---|---|---|---|
| xxxx | — | — | xxxx/xx/xx xx:xx | xxxx/xx/xx xx:xx | |
| xxxxxxxxx | — | — | xxxx/xx/xx xx:xx | — | |
| xxxxxxxxxxxxx | — | — | xxxx/xx/xx xx:xx | — | |
| xxxxx | — | — | xxxx/xx/xx xx:xx | — | |
| xxxxxxxxxxxxxxx | — | — | xxxx/xx/xx xx:xx | — | |
| xxxxxxxxxxx | — | — | xxxx/xx/xx xx:xx | xxxx/xx/xx xx:xx | |

506

VERIFICATION — 504
CLOSE — 505

FIG. 14

| CERTIFICATE | CERTIFICATE STATUS | CERTIFICATE-USING DOCUMENT |
|---|---|---|
| A | INVALID | DOCUMENT M, DOCUMENT X |
| B | NOT YET VERIFIED | DOCUMENT S, DOCUMENT T |
| C | INVALID | DOCUMENT P |
| D | NOT YET VERIFIED | DOCUMENT X |
| ⋮ | ⋮ | ⋮ |

2001  2002  2003

DOCUMENT VERIFICATION APPARATUS AND METHOD

BACKGROUND OF THE INVENTION

1. Field of the Invention

The present invention relates to an apparatus capable of verifying an electronic document and a corresponding method.

2. Description of the Related Art

Signature technology employing an electronic signature and a time stamp signature is known. Also, there is known a technique for, when an electronic document added with an electronic signature is subsequently edited (i.e., updated after the addition of the first electronic signature), adding another electronic signature corresponding to the subsequent editing (Japanese Patent Laid-Open No. 2003-216601). As described in Patent Document 1, a reason why the second electronic signature is added corresponding to the subsequent editing resides in explicitly indicating that a person who has edited the electronic document is responsible for the details of the editing made by the person.

Herein, a time stamp signature and an electronic signature associated with an electronic document are collectively referred to as a signature. Accordingly, the expression "adding an electronic signature" is used to describe any of the following cases: (1) a case of adding an electronic signature, (2) a case of adding a time stamp signature, and (3) a case of adding both an electronic signature and a time stamp signature.

Further, Japanese Patent Laid-Open No. 2003-216601 discloses a method of, in a process of verifying an electronic document subjected to editing or added with a signature corresponding to the editing, extracting an editing assurance signature from edit records before one generation, and verifying the extracted signature. More specifically, the disclosed method performs the verification by comparing a hash value calculated from editing differential information before one generation with a hash value decoded from a history assurance signature by using a public key for a person who made the editing in the same generation. When the verification of the history assurance signature is completed, update differential information before one generation is acquired and the electronic document is restored based on the text of the electronic document and the update differential information before one generation.

With the technique disclosed in Japanese Patent Laid-Open No. 2003-216601, however, when an electronic document is added with a plurality of signatures and those signatures are to be verified together, a long verification time may be required. Accordingly, there is a demand for verifying an electronic document added with a plurality of signatures in a shorter verification time.

SUMMARY OF THE INVENTION

According to one aspect of the present invention, an embodiment is directed to an apparatus including a first verification unit configured to verify a first signature added to an electronic document, a second verification unit configured to verify, after the verification by the first verification unit, a second signature added to the electronic document before the first signature, and a verification integrating unit configured to decide a verification result of the electronic document by using verification results of the first verification unit and the second verification unit. If the first verification unit determines that the electronic document has been edited after addition of the first signature, the second verification unit does not execute a process of determining whether the electronic document has been edited after addition of the second signature.

Further features of the present invention will become apparent from the following description of exemplary embodiments with reference to the attached drawings.

BRIEF DESCRIPTION OF THE DRAWINGS

FIG. 2 shows one example of the configuration of a certificate management table.

FIG. 4D shows one example of a preview dialog in the electronic document registration process.

FIG. 9C shows one example of a search result dialog in the electronic document verification process.

FIG. 14 shows one practical example of a table resulting from the determination as to whether a certificate is required to be verified.

DESCRIPTION OF THE EMBODIMENTS

Information processing according to exemplary embodiments of the present invention will be described in detail below with reference to the drawings.

First Exemplary Embodiment

Configuration of Document Management System

Figure 1:
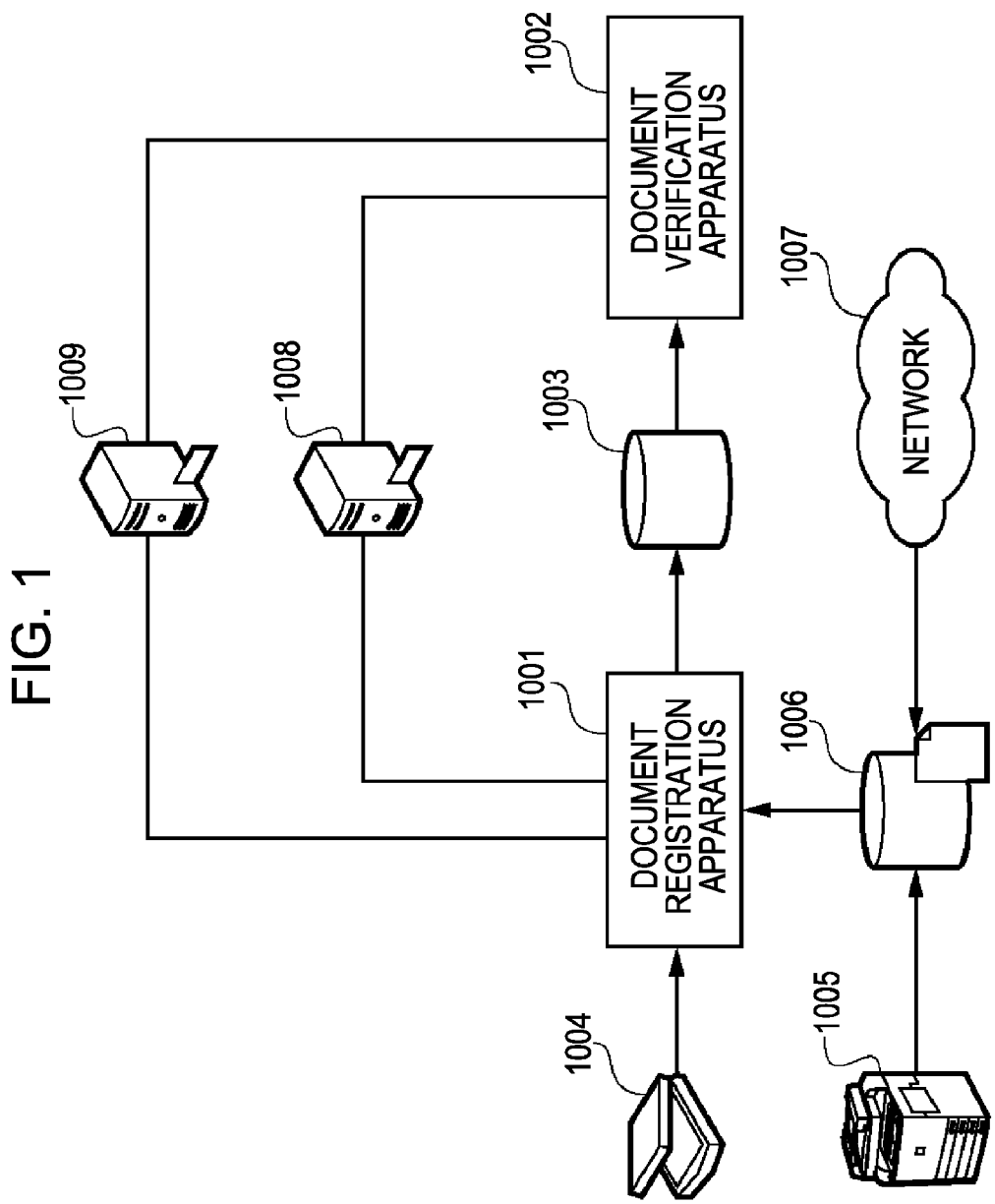
FIG. 1 is a diagram showing one example of the configuration of a document management system.

FIG. 1 is a diagram showing one example of the configuration of a document management system according to a first exemplary embodiment.

A document management server 1003 is configured to perform a number of functions, including storing various kinds of electronic documents as data files and searching for, among the stored electronic documents, and retrieving an electronic document as requested by a user.

A document registration apparatus 1001 produces a new electronic document by adding a signature to an old electronic document and transmits the new electronic document to a document management server 1003 to be stored therein. In the following description, the operation of the document registration apparatus 1001 transmitting the electronic document to the document management server 1003 to be stored therein is expressed by "registration of the electronic document".

The document registration apparatus 1001 has a function of controlling a scanner 1004 and acquiring an electronic document as electronic data in the JPEG format, for example. Also, the document registration apparatus 1001 can acquire an electronic document stored in a shared storage 1006. The shared storage 1006 stores, for example, electronic documents affixed to electronic mails which are received via a network 1007 such as the Internet, and electronic documents read by a multi-function printer (MFP) 1005 and sent from the MFP 1005 with the transmitting function thereof.

A document verification apparatus 1002 accesses an electronic document stored in the document management server 1003 and verifies the electronic document. More specifically, the document verification apparatus 1002 verifies the electronic document by determining validity of an electronic signature added to the electronic document, or by instructing a time stamp server to determine validity of a time stamp signature added to the electronic document and receiving a determination result from the time stamp server.

Each of the document management server 1003, the document registration apparatus 1001, and the document verification apparatus 1002 includes a CPU and a memory (not shown). The CPU executes programs stored in the memory to realize the functions of the document management system. Further, electronic documents are stored in a storage, such as a hard disk, which is operated under control of the document management server 1003. While the document registration apparatus 1001 and the document verification apparatus 1002 are shown as being separate apparatuses in FIG. 1, they can be constituted as a single apparatus having the functions of both the apparatuses.

Registration of Electronic Document

Figure 3:
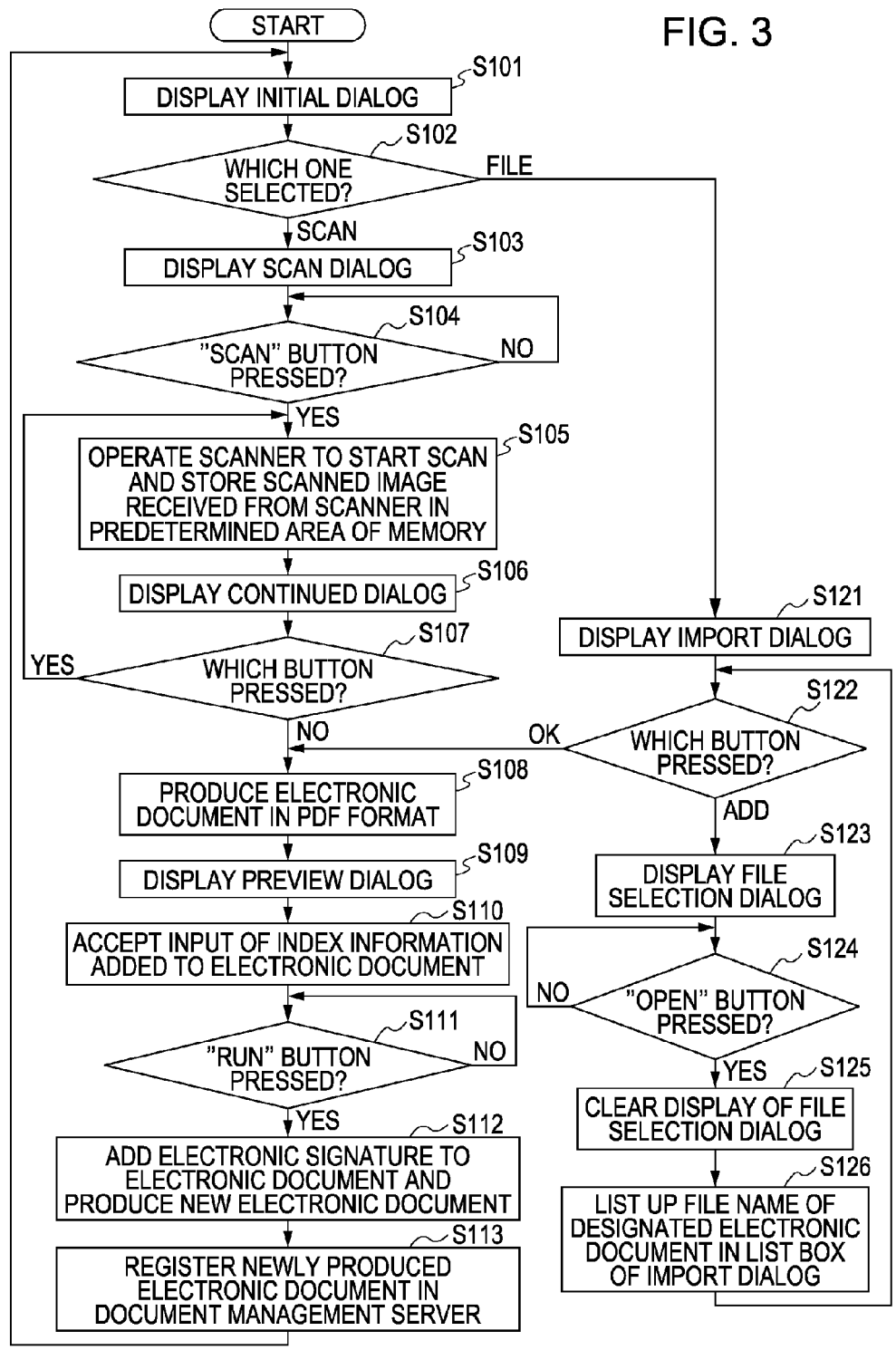
FIG. 3 is a flowchart for explaining a process in which a document registration apparatus acquires an electronic document and registers the acquired electronic document in a document management server.

FIG. 3 is a flowchart for explaining a process in which the document registration apparatus 1001 acquires an electronic document and registers the acquired electronic document in the document management server 1003.

Figure 4A:
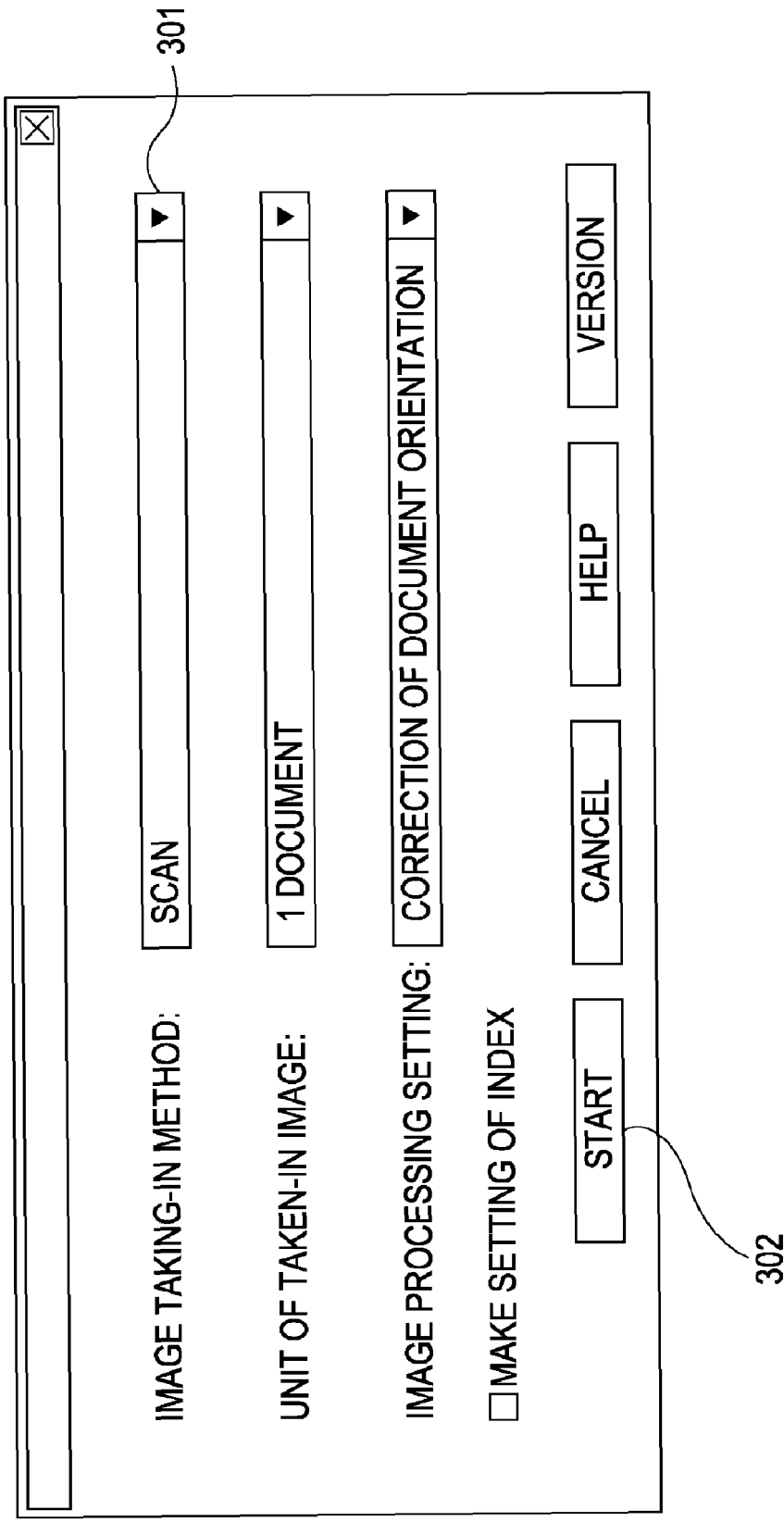
FIG. 4A shows one example of an initial dialog in the electronic document registration process.
Figure 4B:
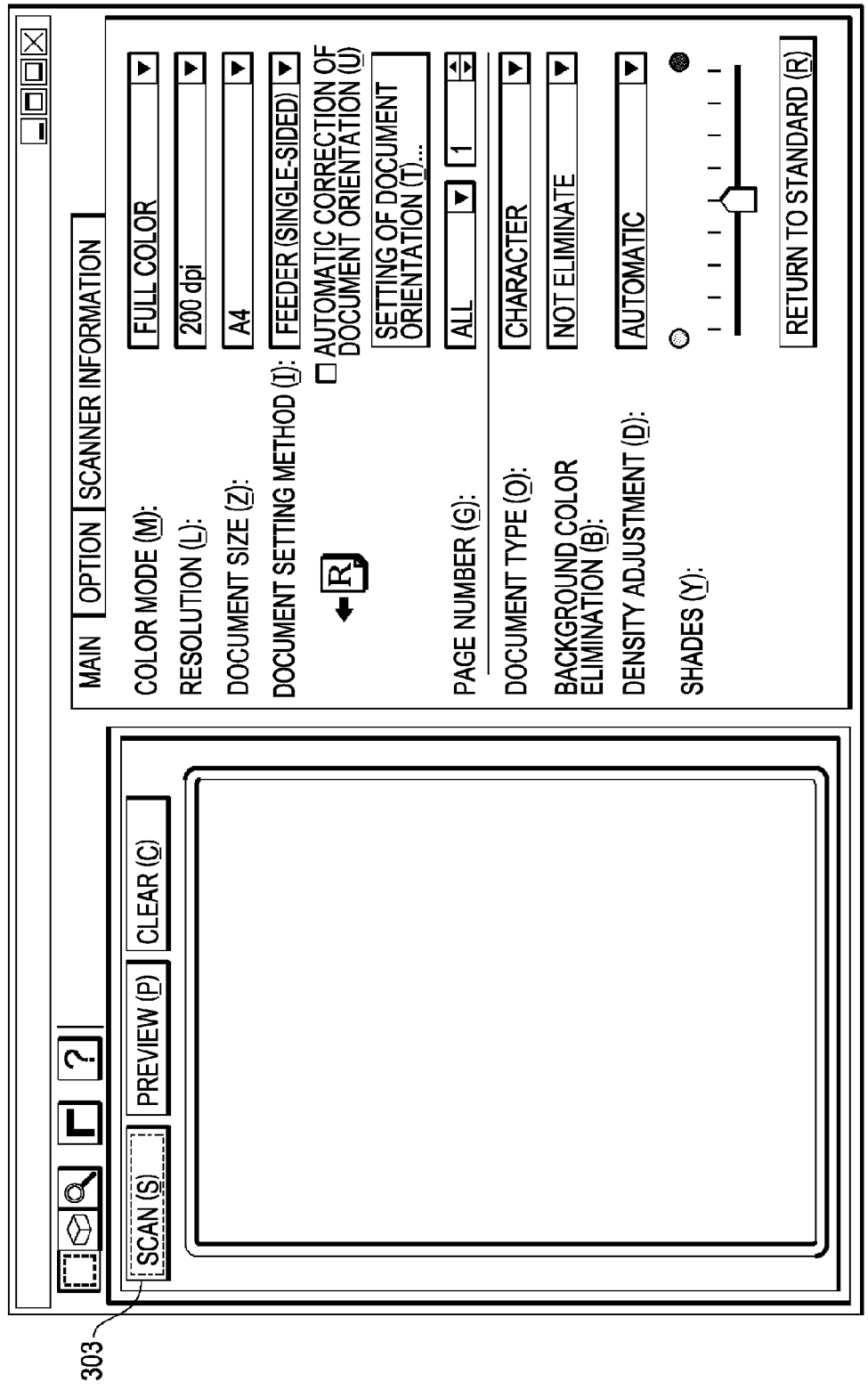
FIG. 4B shows one example of a scan dialog in the electronic document registration process.

First, the document registration apparatus 1001 displays an initial dialog, shown in FIG. 4A, on a monitor (S101). By employing an input device, such as a keyboard or mouse, connected to the document registration apparatus 1001, a user can select "SCAN" or "FILE" from a dropdown menu in a text box 301 of the initial dialog. If the user selects "SCAN" and then presses a "START" button 302 in the initial dialog (S102), the document registration apparatus 1001 displays a scan dialog, shown in FIG. 4B, for various kinds of settings for a scan (S103).

Figure 4C:
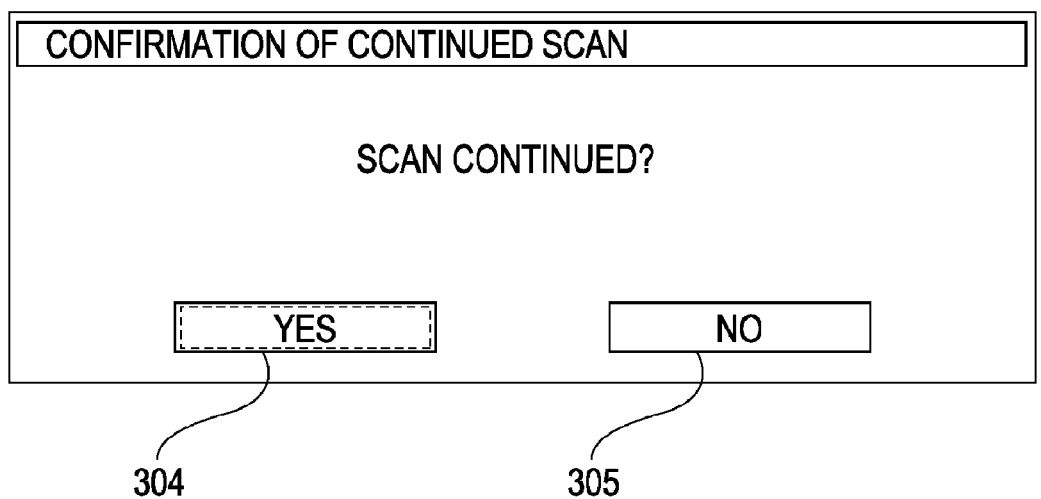
FIG. 4C shows one example of a continuation dialog in the electronic document registration process.

After setting a color mode and resolution with input operations on the scan dialog, the user presses a "SCAN" button 303 in the scan dialog (S104). Responsively, the document registration apparatus 1001 instructs the scanner 1004 to start the scan, and temporarily stores a scanned image, which is received from the scanner 1004, in a predetermined area of a memory within the document registration apparatus 1001 (S105). Thereafter, the document registration apparatus 1001 displays a continuation dialog, shown in FIG. 4C, for prompting the user to select whether the scan is to be continued (S106).

If the user presses a "YES" button 304 in the continuation dialog (S107), the document registration apparatus 1001 returns the processing to step S105 to display the scan dialog. If the user presses a "NO" button 305 in the continuation dialog (S107), the document registration apparatus 1001 produces an electronic document in the PDF (portable document format), for example, from the scanned image stored in the predetermined area of the memory within the apparatus 1001 and stores the produced electronic document in another predetermined area of the memory (S108).

Figure 4E:
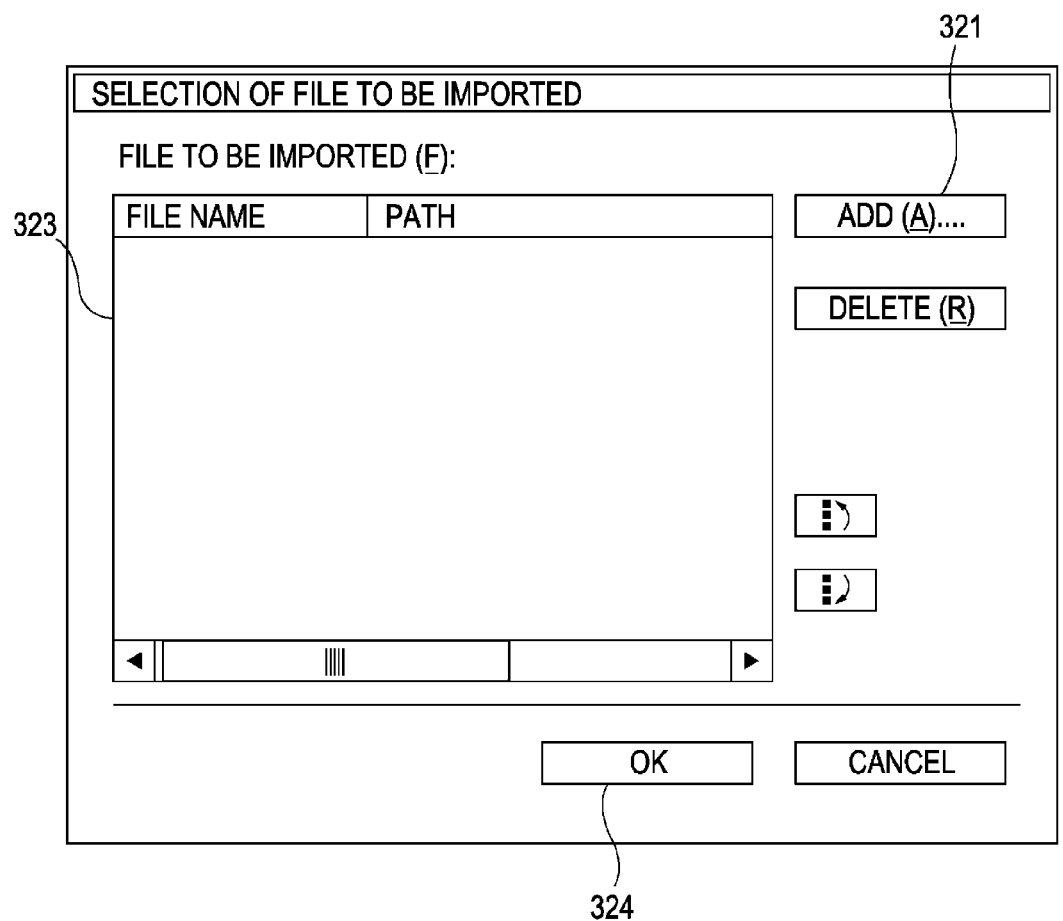
FIG. 4E shows one example of an import dialog in the electronic document registration process.
Figure 4F:
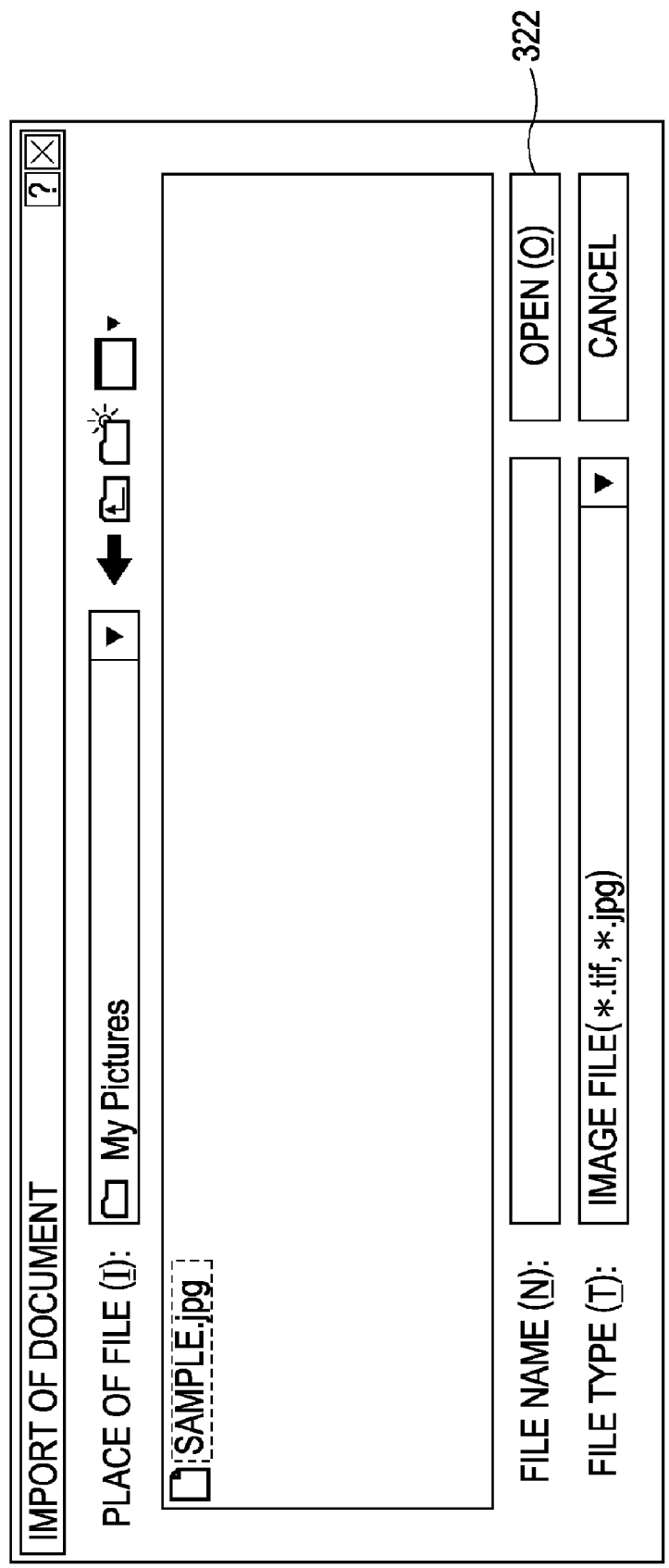
FIG. 4F shows one example of a file selection dialog in the electronic document registration process.

On the other hand, if the user selects "FILE" and then presses the "START" button 302 in the initial dialog (S102), the document registration apparatus 1001 displays an import dialog, shown in FIG. 4E, for prompting the user to designate an electronic document to be imported (S121). If the user presses an "ADD" button 321 in the import dialog (S122), the document registration apparatus 1001 displays a file selection dialog, shown in FIG. 4F, for prompting the user to select an electronic document (S123). The user designates the file name of the electronic document with an input operation on the file selection dialog and presses an "OPEN" button 322 in the file selection dialog (S214). Responsively, the document registration apparatus 1001 clears the display of the file selection dialog (S125) and lists the file name of the designated electronic document in a list box 323 of the import dialog (S126). The processing is then returned to step S122.

If the user presses an "OK" button 324 in the import dialog (S122), the document registration apparatus 1001 advances the processing to step S108. The electronic documents listed in the list box 323 are successively read from the shared storage 1006, converted to electronic documents in the PDF format, and stored in the predetermined area of the memory (S108).

When the production of each electronic document (S108) is completed, the document registration apparatus 1001 displays a preview dialog shown in FIG. 4D (S109).

Figure 4G:
FIG. 4G shows one example of a processing status display dialog in the electronic document registration process.

The preview dialog is a dialog for previewing the electronic document in the PDF format. On the preview dialog, the user inputs, for example, index information to be added to the electronic document (S110). If the input of the index information is completed and the user presses a "RUN" button 306 in the preview dialog (S111), the document registration apparatus 1001 adds an electronic signature and a time stamp signature to the electronic document, thus producing a new electronic document (S112). The document registration apparatus 1001 registers the newly produced electronic document in the document management server 1003 (S113), and then returns the processing to step S101. In parallel to the operation of registering the electronic document in the document management server 1003, the document registration apparatus 1001 displays a processing status display dialog, shown in FIG. 4G, which shows the current processing status. When the registration of all the electronic documents is completed, the document registration apparatus 1001 clears the display of the processing status display dialog.

Registration Process

Figure 5:
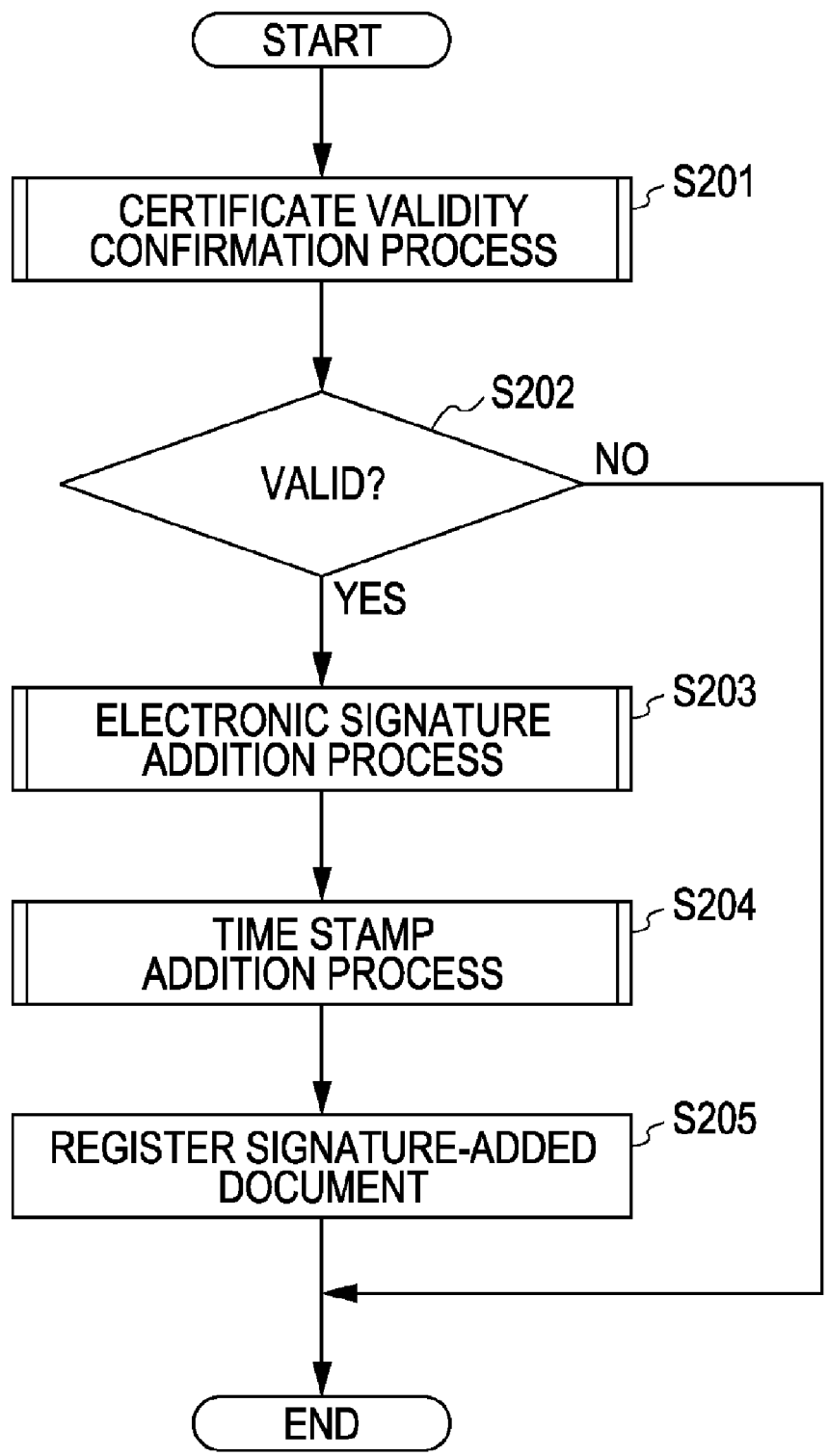
FIG. 5 is a flowchart for explaining a process in which the document registration apparatus adds a signature to the electronic document and registers it in the document management server.

FIG. 5 is a flowchart for explaining a process (S112-S113) in which the document registration apparatus 1001 adds the electronic signature and the time stamp signature to the electronic document and registers it in the document management server 1003.

It is assumed that, prior to executing the process shown in FIG. 5, a hash function, a private key, and a certificate corresponding to the private key are stored in a memory of the document registration apparatus 1001 in advance. It is also assumed that the certificate includes a public key and describes, for example, the serial number of the certificate, information indicating an issuing source (server) of the certificate, information regarding the owner of the private key (e.g., the name of the owner of the private key), and the valid term of the certificate.

The document registration apparatus 1001 confirms validity of a certificate for use with the electronic signature (hereinafter referred to as a "target certificate") (S201) and determines whether the target certificate is valid (S202). If the target certificate is valid, the processing is advanced to step S203, and if the target certificate is invalid, the processing is brought to an end. Details of the process of confirming the validity of the target certificate will be described later.

Next, by using the target certificate of which validity has been confirmed, the document registration apparatus 1001 adds the electronic signature to the electronic document to produce a new electronic document (S203). Details of the process of adding the electronic signature will be described later.

Next, the document registration apparatus 1001 adds the time stamp signature to the electronic document to which the electronic signature has been added, thus producing a further new electronic document (S204). Details of the process of adding the time stamp signature will be described later.

Next, the document registration apparatus 1001 registers, in the document management server 1003, the electronic document added with both the electronic signature and the time stamp signature (S205). Thereafter, the processing is brought to an end.

While the above description is made as adding the electronic signature and the time stamp signature to the electronic document and producing the new electronic document, it is not essential to produce the new electronic document. For example, the electronic document as per before adding the electronic signature thereto, the electronic signature, and the time stamp signature can be registered in the document management server 1003 in separate files while they are related with one another. Note that if any of the processes of adding the electronic signature, adding the time stamp signature, and registering the electronic document is failed, an appropriate error process is executed.

Certificate Validity Confirmation Process

Figure 6A:
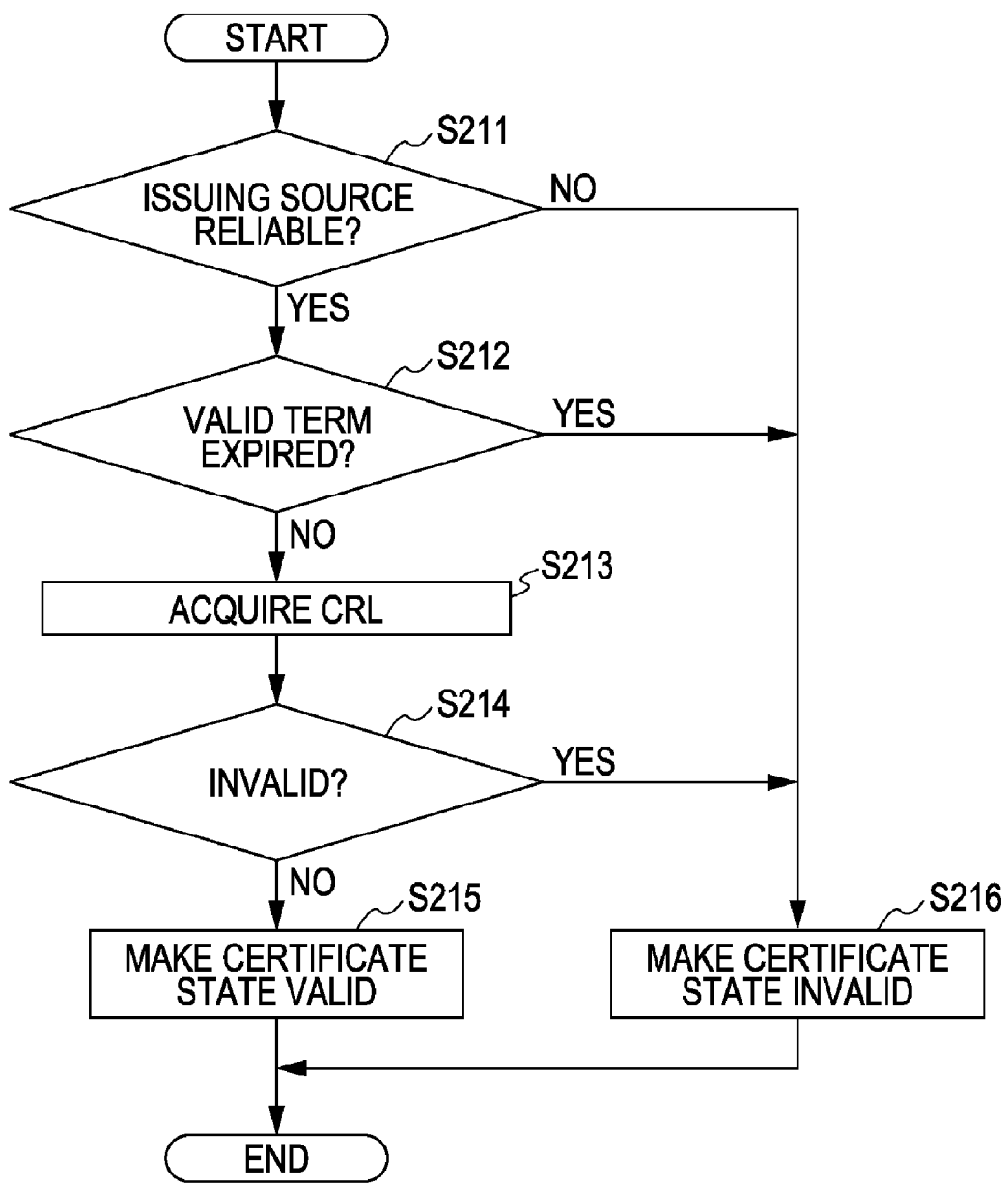
FIG. 6A is a flowchart showing details of a certificate validity confirmation process.

FIG. 6A is a flowchart showing details of the certificate validity confirmation process (S201).

The document registration apparatus 1001 acquires information regarding the issuing source of the target certificate and determines whether the issuing source is a reliable server (certification authority) (S211). If the issuing source is determined to be reliable, the processing is advanced to step S212. If the issuing source is determined to be not reliable, the state of the target certificate is made invalid (S216) and the processing is brought to an end. It is here assumed that the information regarding the reliable issuing source (server) is registered in the document management server 1003 in advance. In the following description, unless otherwise specified, a certificate server 1009 (see FIG. 1) at the issuing source is assumed to be a reliable server. Further, unless otherwise specified, the issuing source of the certificate is the certificate server 1009.

Next, the document registration apparatus 1001 acquires information regarding the valid term which is described in the target certificate, and determines whether the valid term of the target certificate is expired (S212). If the valid term is not expired, the processing is advanced to step S213. If the valid term is expired, the state of the target certificate is made invalid (S216) and the processing is brought to an end.

Next, the document registration apparatus 1001 acquires a CRL (certificate revocation list), i.e., a list of the certificates which have been set to be invalid, from the certificate server 1009 as the issuing source of the target certificate (S213). Further, the document registration apparatus 1001 determines whether the target certificate is included in the CRL (S214). If the target certificate is not included in the CRL, the state of the target certificate is made valid (S215). If the target certificate is included in the CRL, this means that the target certificate has been set to be invalid. Therefore, the state of the target certificate is made invalid (S216) and the processing is brought to an end.

Electronic Signature Addition Process

Figure 6B:
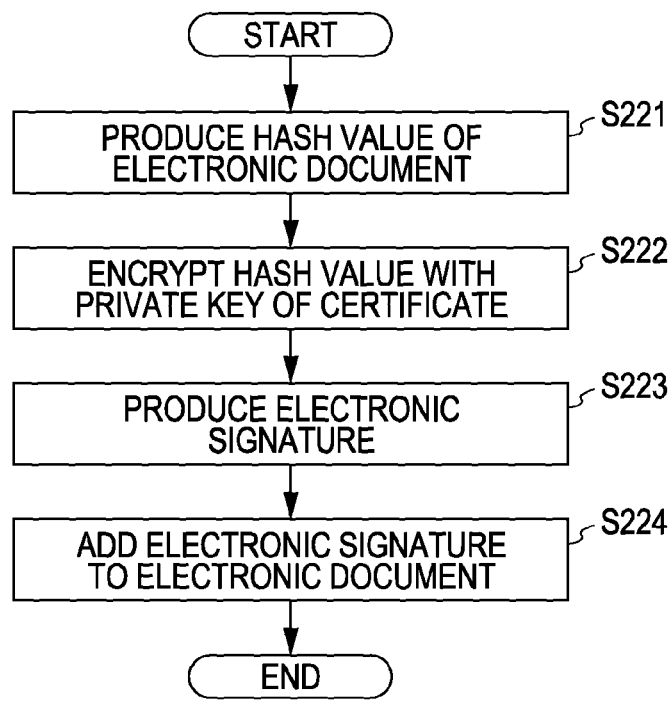
FIG. 6B is a flowchart for explaining an electronic signature addition process.

FIG. 6B is a flowchart for explaining the electronic signature addition process (S203).

The document registration apparatus 1001 calculates a hash value of the electronic document (S221). The hash value can be calculated by using a hash function, such as MD5 or SHA-1. When a signature has already been added to the electronic document, the hash value is calculated including the signature.

Figure 7A:
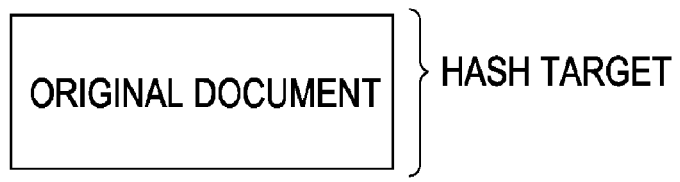
FIGS. 7A, 7B and 7C each shows the relationship between an original electronic document and a hash value calculation target (hash target).
Figure 7B:
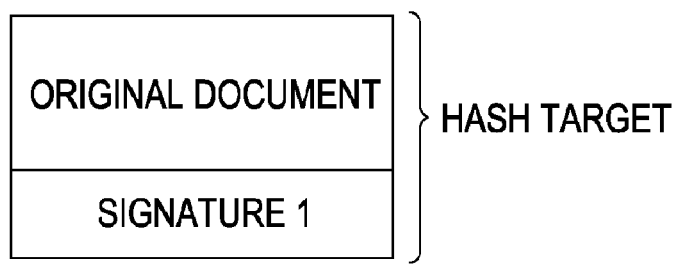
Figure 7C:
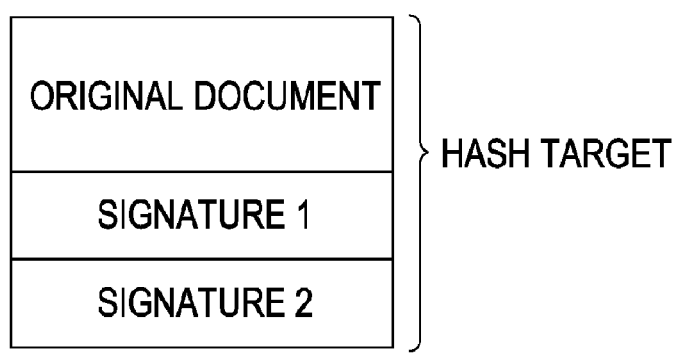

FIGS. 7A, 7B and 7C each show the relationship between an original electronic document and a hash value calculation target (hash target).

The electronic document in FIG. 7A includes only an original document. In other words, any signature is not yet added to the electronic document. When an electronic signature is added to the electronic document which is not yet added with any signature, only the original document becomes the hash value calculation target. By adding the electronic signature to the electronic document shown in FIG. 7A, an electronic document shown in FIG. 7B is produced. The electronic document shown in FIG. 7B includes the original document and the electronic signature (Signature 1).

When another electronic signature is added to the electronic document shown in FIG. 7B, both of the original document and Signature 1 become the hash value calculation target. By adding the other electronic signature to the electronic document shown in FIG. 7B, an electronic document shown in FIG. 7C is produced. The electronic document shown in FIG. 7C includes the original document, the electronic signature (Signature 1), and still another electronic signature (Signature 2).

Next, the document registration apparatus 1001 encrypts the hash value, which has been calculated in step S221, with the private key included in the target certificate (S222), thus producing an electronic signature which includes the encrypted hash value and the target certificate (S223). The produced electronic signature is added to the electronic document (S224). The format of the electronic signature can be, e.g., PKCS#7 or PDF signature format.

Time Stamp Signature Addition Process

Figure 6C:
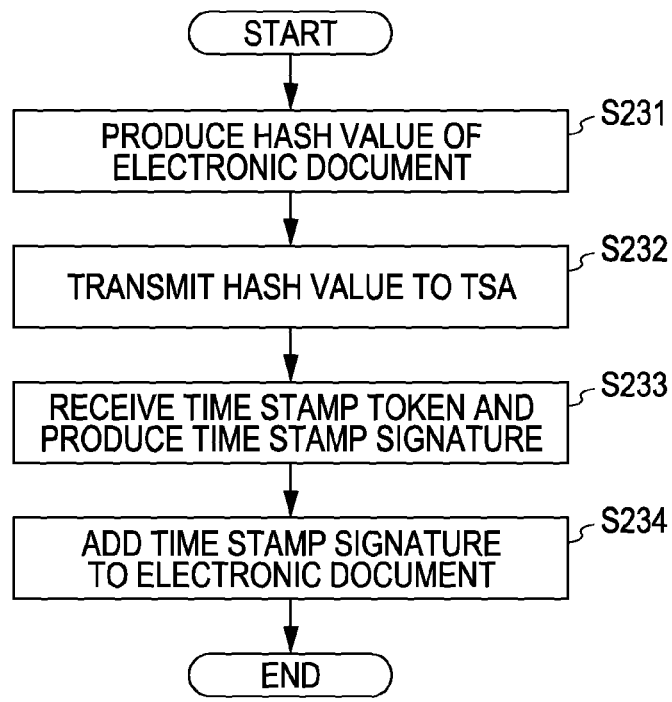
FIG. 6C is a flowchart for explaining a time stamp signature addition process.

FIG. 6C is a flowchart for explaining the time stamp signature addition process (S204).

The document registration apparatus 1001 calculates a hash value of the electronic document (S234) which has been added with the electronic signature in step S203. As in the case of adding the electronic signature, the hash value calculation target includes all the signatures added to the original document.

Next, the document registration apparatus 1001 transmits the calculated hash value to a time stamping server (or a time stamping authority (TSA), see FIG. 1) 1008 (S232).

It is here assumed that the electronic document before the addition of the electronic signature thereto in the electronic signature addition process (S203) includes only the original document, as shown in FIG. 7A. In that case, as shown in FIG. 7B, a document file including the original document and the electronic signature (Signature 1) is produced in step S203. Therefore, the hash value is calculated in step S232 from both the original document and the electronic signature (Signature 1).

Then, the document registration apparatus 1001 transmits the calculated hash value to the time stamping server (or the time stamping authority (TSA), see FIG. 1) 1008 (S232).

When the time stamping server 1008 receives the hash value, it encrypts the received hash value with a private key specific to the time stamping server 1008 and produces information containing the encrypted hash value and the current time in the form integrated with each other. Further, a time stamp token including a certificate which has a public key corresponding to the private key is produced and returned to the document registration apparatus 1001 together with the integrated information.

When the document registration apparatus 1001 receives the time stamp token from the time stamping server 1008, it produces a time stamp signature including the received time stamp token and other necessary information (S233). The produced time stamp signature is added to the electronic document (S234) which is already added with the electronic signature.

Thus, according to the first exemplary embodiment, the time stamp signature is added to the electronic document which is already added with the electronic signature. By adding the time stamp signature, it is possible to prove later the fact that the electronic signature had already been added to the electronic document before the date and time included in the time stamp signature.

Verification of Electronic Document

Figure 8:
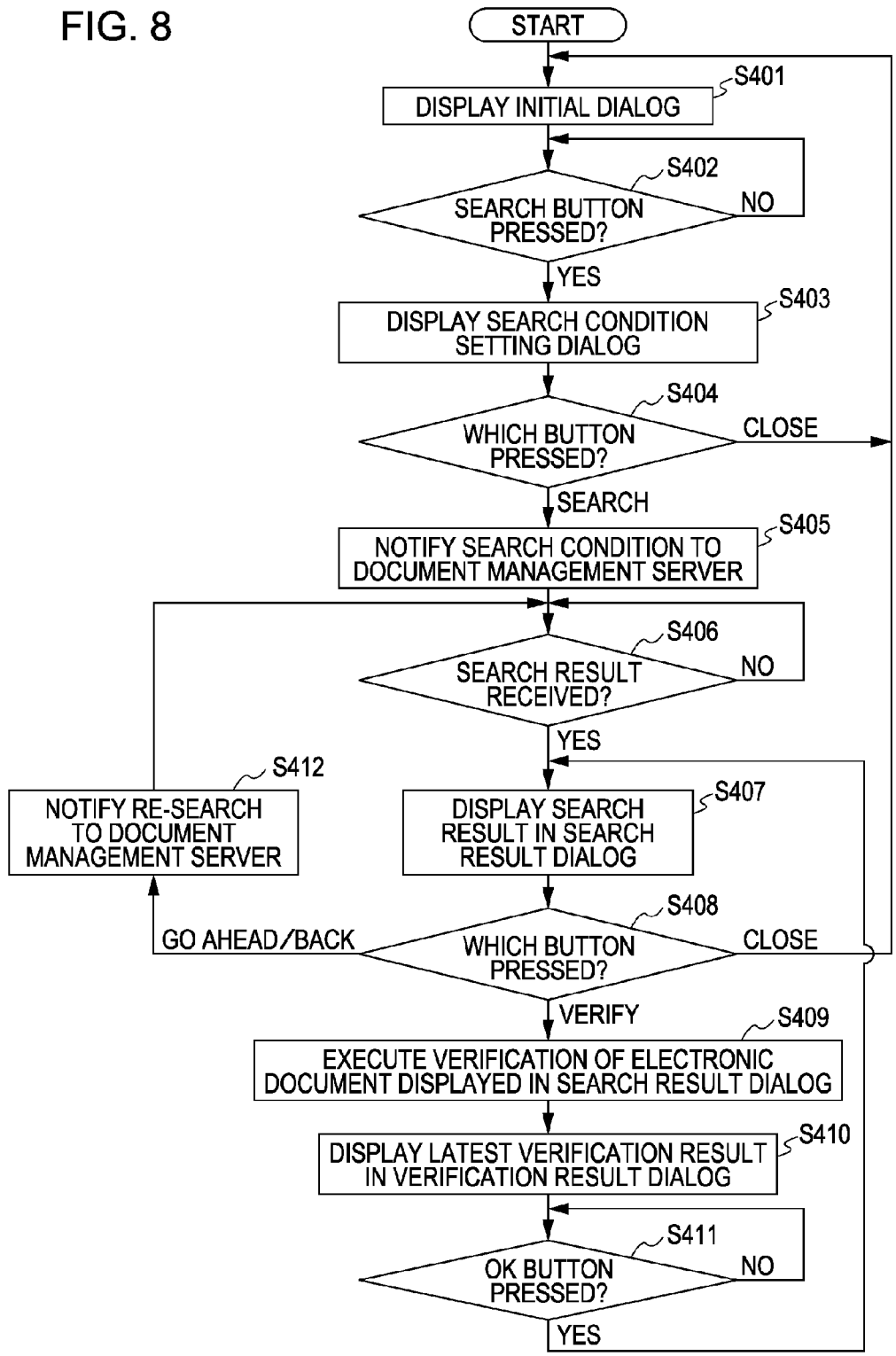
FIG. 8 is a flowchart for explaining a process in which a document verification apparatus verifies the electronic document registered in the document management server.

FIG. 8 is a flowchart for explaining a process in which the document verification apparatus 1002 verifies the electronic document registered in the document management server 1003.

Figure 9A:
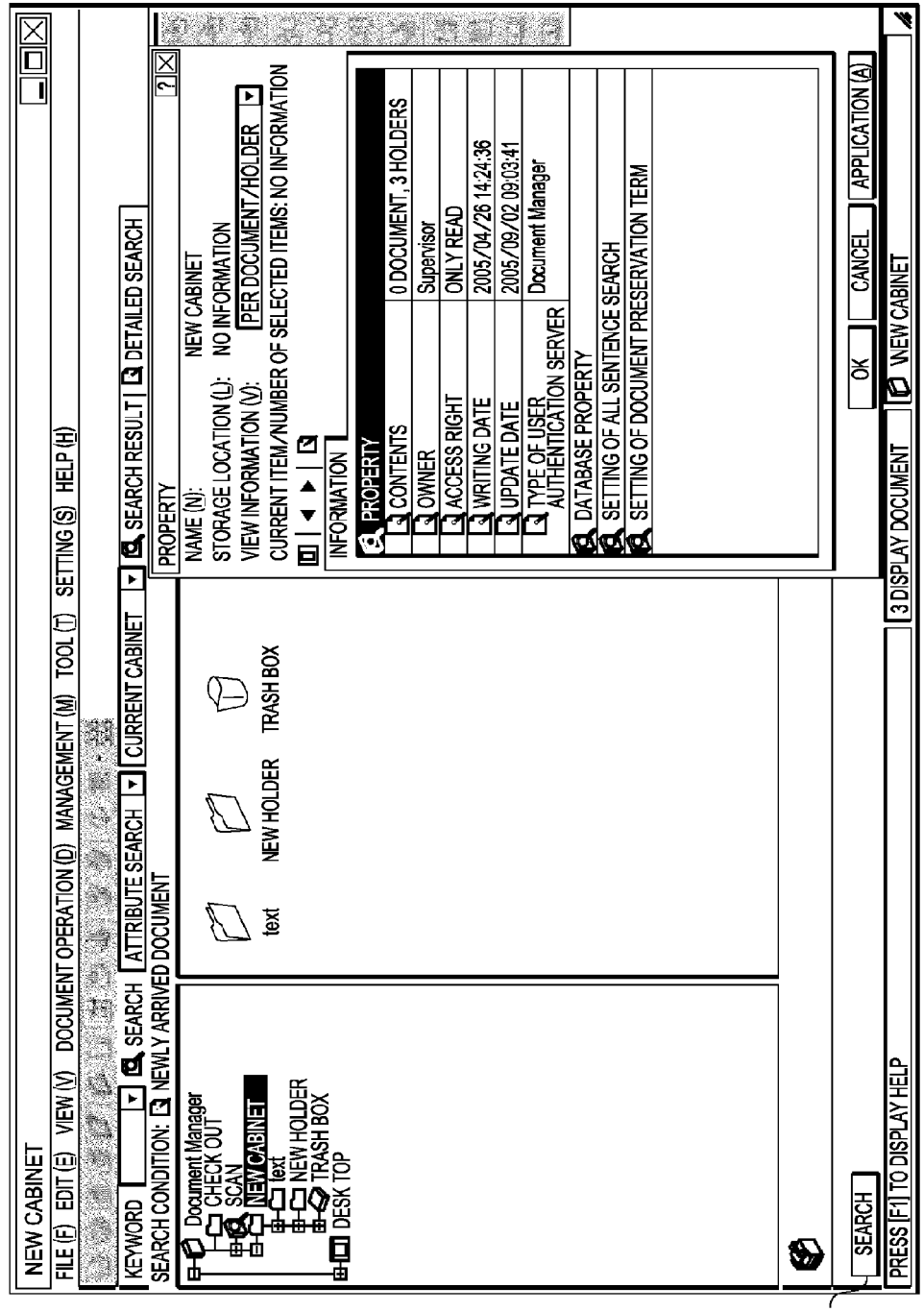
FIG. 9A shows one example of an initial dialog in the electronic document verification process.
Figure 9B:
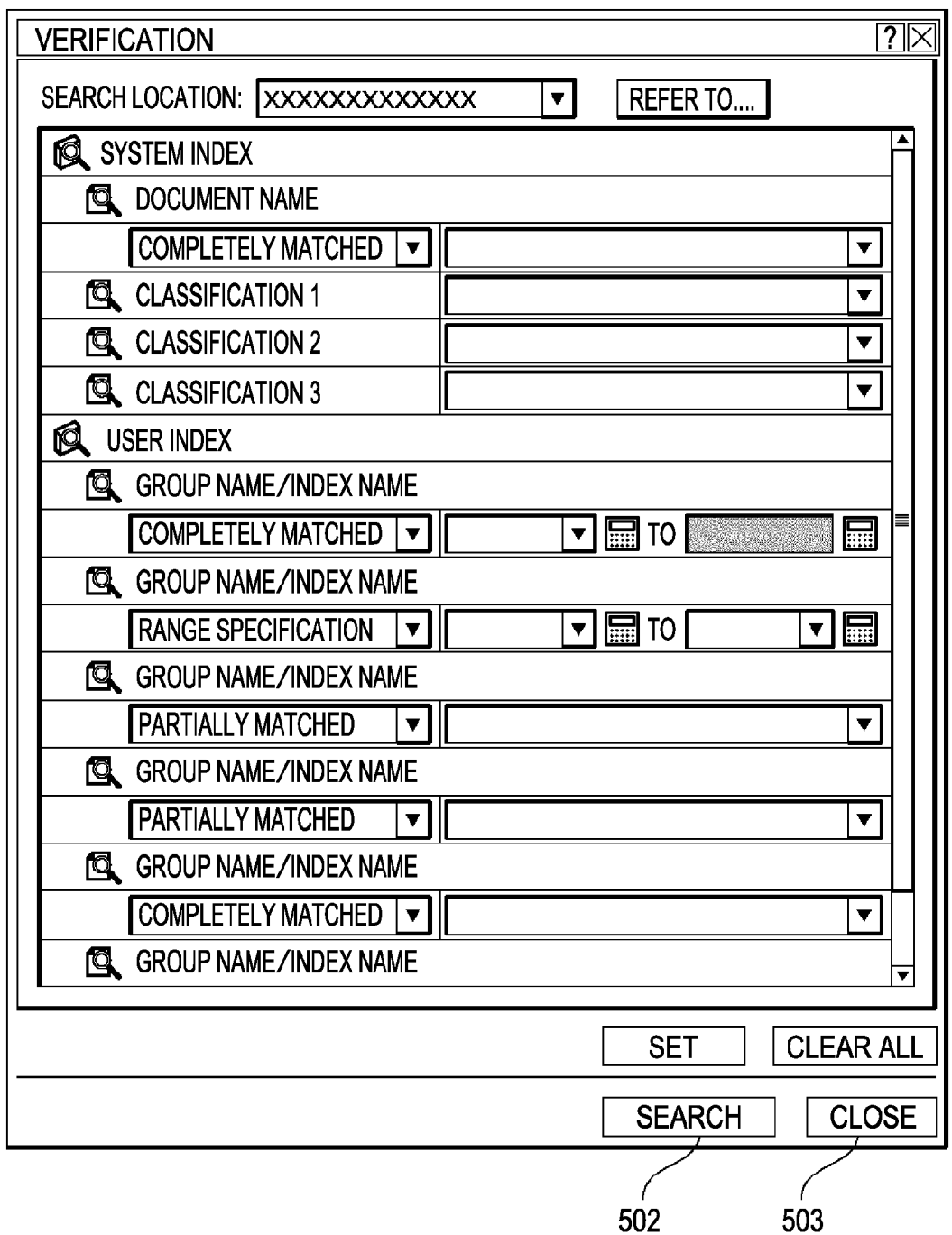
FIG. 9B shows one example of a search condition setting dialog in the electronic document verification process.

First, the document verification apparatus 1002 displays an initial dialog, shown in FIG. 9A, on the not-shown monitor (S401). The initial dialog is a dialog for displaying the file names of electronic documents registered in the document management server 1003. If the user presses a "search" button 501 in the initial dialog (S402), the document verification apparatus 1002 displays a search condition setting dialog shown in FIG. 9B (S403). The search condition setting dialog is a dialog for setting a search condition necessary when the user searches for the desired one from among the electronic documents registered in the document management server 1003.

If the user presses a "CLOSE" button 503 in the search condition setting dialog (S404), the document verification apparatus 1002 returns the processing to step S401. Further, if the user sets the search condition in the search condition setting dialog and then presses a "SEARCH" button 502 (S404), the set search condition (including the number of searches designated by the user in advance) is notified to the document management server 1003 (S405).

The document management server 1003 having received the search condition searches the electronic documents registered in the document management server 1003 in accordance with the search condition and replies a search result to the document verification apparatus 1002.

If the document verification apparatus 1002 receives the search result (S406), it displays a search result dialog shown in FIG. 9C to indicate the received search result (S407). The search result dialog displays the file names of the electronic documents in number designated by the user in advance. If the user presses a "go ahead" or "go back" button 506 in the search result dialog (S408), the document verification apparatus 1002 notifies re-search to the document management server 1003 (S412). Then, the processing is returned to step S406 to display, on the search result dialog, a result of the re-search executed in accordance with the same search condition. In response to the notification, the document management server 1003 replies a succeeding or preceding set of the file names of the electronic documents in the designated number to the document verification apparatus 1002.

Figure 9D:
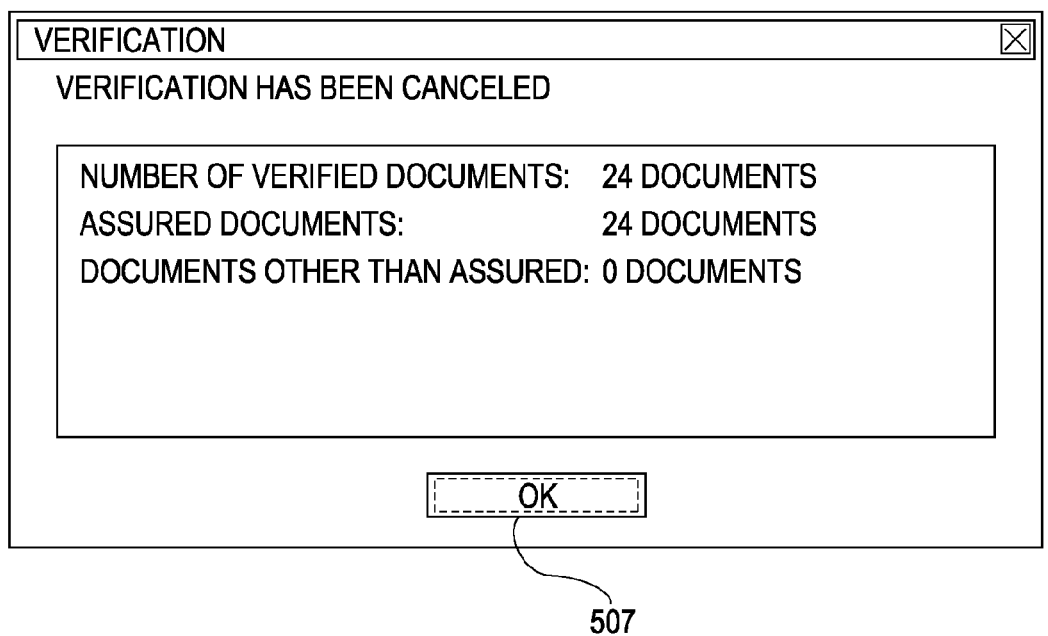
FIG. 9D shows one example of a verification result dialog in the electronic document verification process.

On the other hand, if the user presses a "VERIFICATION" button 504 in the search dialog (S408), the document verification apparatus 1002 executes verification of one or more electronic documents displayed in the search result dialog (S409). Then, the document verification apparatus 1002 displays the latest verification result in a verification result dialog shown in FIG. 9D (S410).

If the user presses an "OK" button 507 in the verification result dialog (S411), the document verification apparatus 1002 returns the processing to step S407. At that time, the verification result of each electronic document is newly displayed in the corresponding column of the search dialog.

If the user presses a "CLOSE" button 505 in the search dialog (S408), the document verification apparatus 1002 returns the processing to step S401.

Verification Process

Figure 10A:
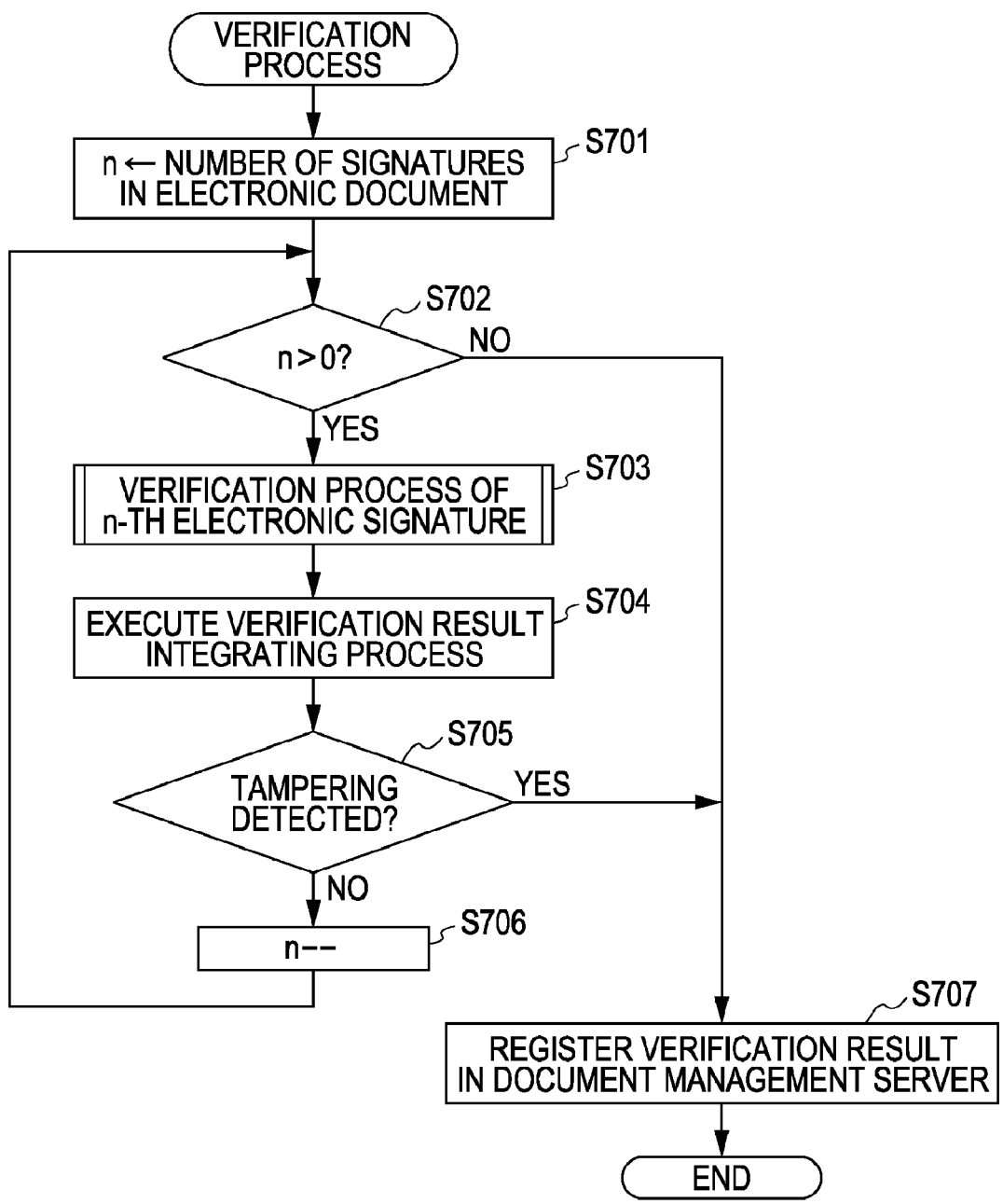
FIG. 10A is a flowchart showing details of the electronic document verification process.

FIG. 10A is a flowchart showing details of the electronic document verification process.

The document verification apparatus 1002 decides an electronic document to be verified (hereinafter referred to as a "target electronic document") and executes verification of the target electronic document. In the verification, the document verification apparatus 1002 determines validity of the target electronic document based on the "validity" of each of signatures included in the target electronic document.

Figure 11A:
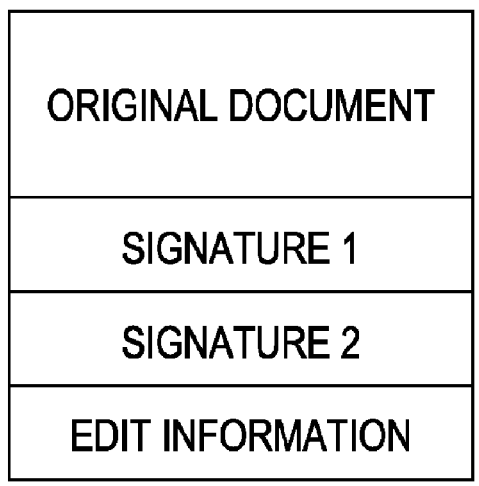
FIGS. 11A and 11B are tables for explaining the relationship among the original document, signatures, and edit information.

The document verification apparatus 1002 counts the number of the signatures included in the target electronic document and sets the counted number in a counter n (S701). It is here assumed that the signatures included in the target electronic document are numbered successively in an ascending manner from the oldest one. For example, as shown in FIG. 11A, the signatures (Signature 1 and Signature 2) included in the target electronic document are assigned with numbers 1 and 2, respectively.

Next, the document verification apparatus 1002 determines whether n>0 is satisfied (S702). In the case of n=0 (i.e., if there is no signature to be verified), the document verification apparatus 1002 advances the processing to step S707 and registers the verification result in the document management server 1003. Also, if there is no signature to be verified (i.e., in the case of n=0 in step S701), that fact is registered as the verification result.

In the case of n>0 (i.e., if there is one or more signatures to be verified), the document verification apparatus 1002 executes the verification process of the n-th signature included in the target electronic document (S703). In other words, the verification process of the latest signature is executed. Details of the verification process will be described later.

Next, based on the verification result of the n-th signature, the document verification apparatus 1002 executes a process of obtaining a verification result of the target electronic document (hereinafter referred to as a "verification result integrating process") (S704). Details of the verification result integrating process will be described later. The verification result of the target electronic document is given by "valid" or "invalid". The result "valid" means the electronic document in which all the signatures are not tampered, the certificates are valid, and no editing is made after each signature. The result "invalid" means any of three types of electronic documents, i.e., one in which the signature is tampered, another one in which the certificate is invalid, and still another one in which editing is made after the signature. In this first exemplary embodiment, it is assumed that the expression "signature is tampered" includes not only the case where the signature is itself tampered, but also the case where the original document is tampered at a later point in time than the addition of the relevant signature.

Next, based on a tampering flag described later, the document verification apparatus 1002 determines whether tampering is detected in the verification of the n-th signature (S705). If the tampering is detected, this means that the electronic document is invalid. Therefore, the subsequent signature verification process is not executed. The document verification apparatus 1002 advances the processing to step S707 and registers the verification result indicating the invalidity of the electronic document in the document management server 1003.

If the tampering is not detected, the document verification apparatus 1002 decrements the counter n (S706) and returns the processing to step S702. Thereafter, the document verification apparatus 1002 repeats the processing of steps S702-S706 until verification of all the signatures included in the target electronic document is completed. Accordingly, the verification result obtained in step S704 at n=1 provides a final verification result of the target electronic document.

Prior to explaining the verification process of the n-th signature, the terms "tampering" and "editing" are defined as follows.

The term "tampering" means an act of fraudulently changing an electronic document including one or more signatures. For example, an act of opening an electronic document including one or more signatures as data in the binary format and changing binary data (e.g., changing a bit value from '1' to '0' or from '0' to '1') is regarded as tampering.

The term "editing" means an act of changing an electronic document including one or more signatures in a not-fraudulent manner. For example, an act of opening an electronic document (e.g., in the PDF format) including one or more signatures as data in the binary format and changing an original document contained in PDF data so as to add information causing a change of the document content to the electronic document is regarded as editing.

Figure 11B:
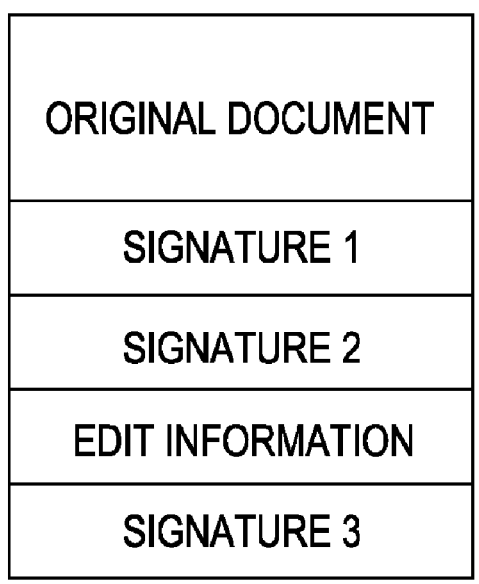

Stated another way, the "tampering" means an act of changing an electronic document such that information of the electronic document before the tampering is lost, and the "editing" means an act of changing an electronic document such that information of the electronic document before the editing is not lost. Information indicating details of the content of the electronic document that are changed by editing (i.e., details of change of the document content) is referred to as "edit information" hereinafter. For example, when the original document shown in FIG. 11A is edited, edit information indicating details of change of the document content is added to the electronic document and still another electronic signature (Signature 3) is added thereto, whereby an electronic document shown in FIG. 11B is produced.

Figure 10B:
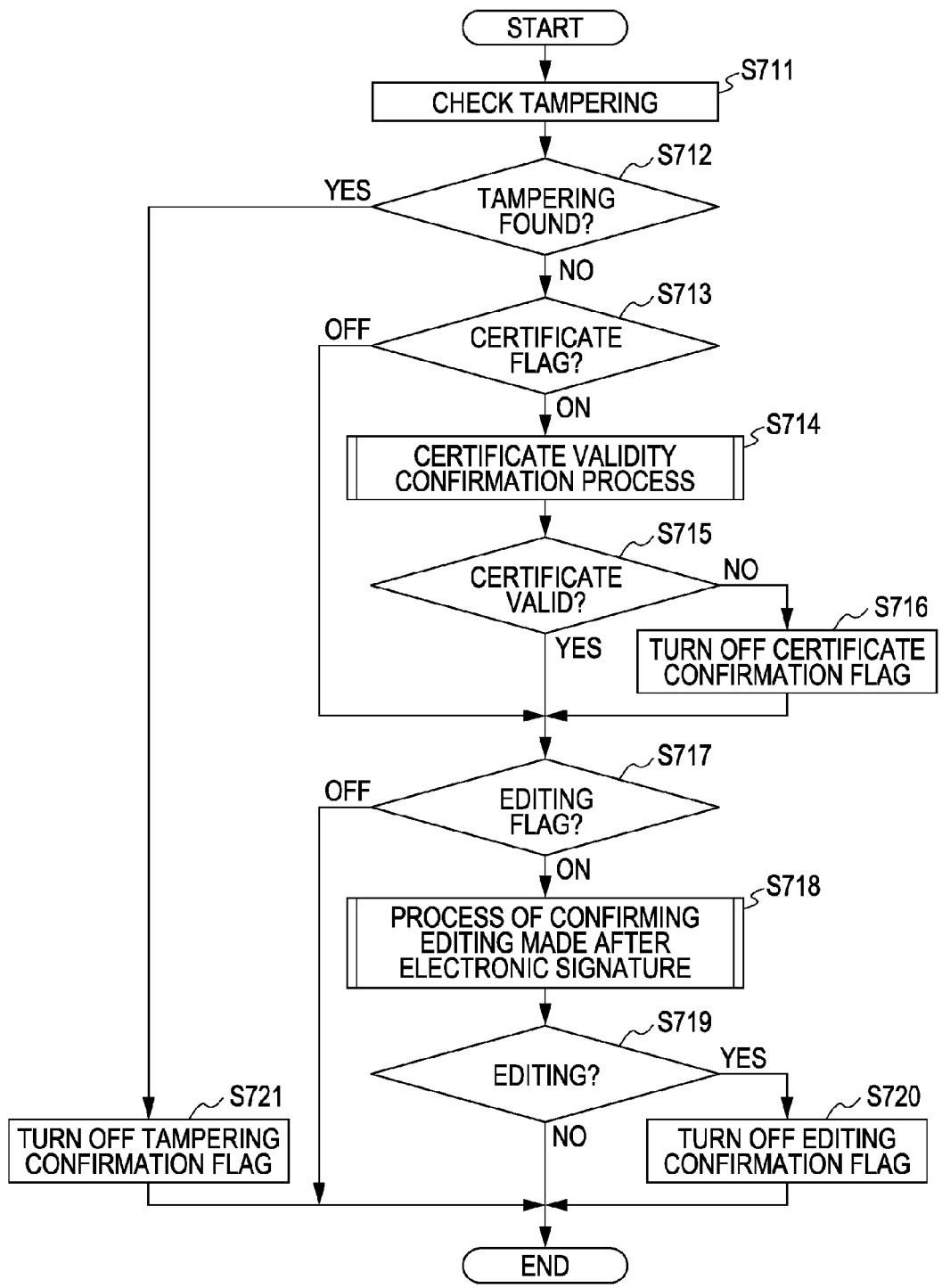
FIG. 10B is a flowchart showing details of an n-th signature verification process.

FIG. 10B is a flowchart showing details of the n-th signature verification process (S703). It is here assumed that, prior to start of the electronic document verification process, a tampering confirmation flag, a certificate confirmation flag, an editing confirmation flag, a tampering flag, a certificate flag, and an editing flag are each turned on.

Turning-on of the tampering confirmation flag means the necessity of performing detection of tampering. Turning-on of the certificate confirmation flag means the necessity of determining validity of the certificate. Turning-on of the editing confirmation flag means the necessity of determining whether the electronic document is edited. Turning-on of the tampering flag means that the electronic document is not tampered. Turning-on of the certificate flag means that the certificate is valid. Turning-on of the editing flag means that the electronic document is not edited.

The document verification apparatus 1002 checks tampering of the target electronic document during a period from the addition of the n-th signature to the addition of the (n+1)-th signature (S711). When the n-th signature is the latest signature added to the target electronic document, the document verification apparatus 1002 checks tampering of the target electronic document after the addition of the n-th (latest) signature.

When the n-th signature is not a time stamp signature, but an ordinary electronic signature, the detailed processing of step S711 is executed as follows.

First, the document verification apparatus 1002 decodes the hash value contained in the n-th electronic signature by using a public key for the certificate contained in the n-th electronic signature. Further, the document verification apparatus 1002 calculates a hash value from the electronic document before the addition of the n-th electronic signature. The decoded hash value is then compared with the calculated hash value. If the comparison result indicates that the two hash values differ from each other, this means that the electronic document is tampered. If the comparison result indicates that the two hash values are the same, this means that the electronic document is not tampered.

When the n-th signature is a time stamp signature, the detailed processing of step S711 is executed as follows.

First, the document verification apparatus 1002 decodes the hash value in a time stamp token contained in the n-th time stamp signature by using a public key contained in the n-th time stamp signature. Further, the document verification apparatus 1002 calculates a hash value from the electronic document before the addition of the n-th time stamp signature. The decoded hash value is then compared with the calculated hash value. If the comparison result indicates that the two hash values differ from each other, this means that the electronic document is tampered. If the comparison result indicates that the two hash values are the same, this means that the electronic document is not tampered.

When the above-described processing of step S711 is completed, the processing is advanced to S712. Based on the processing result of step S711, the document verification apparatus 1002 determines whether the electronic document is tampered or not (S712). If the electronic document is determined to be tampered, the document verification apparatus 1002 turns off the tampering confirmation flag (S721) and brings the verification process to an end. Stated another way, if the tampering is found, the processing is brought to an end without executing subsequent processes (including verification of the certificate and check as to editing made after the addition of the signature), thus cutting a verification time. Herein, the turning-off of the tampering confirmation flag means that the process of confirming tampering for the subsequent signature (i.e., the (n−1)-th signature) is not executed. The reason is that if tampering is found even for one signature, the verification process for the relevant electronic document necessarily provides the result "document is tampered", and continuing the subsequent process of confirming tampering for one or more other signatures is meaningless.

If no tampering is determined in step S712, the document verification apparatus 1002 determines the state of the certificate flag (S713). If the certificate flag is turned on (i.e., if the signature including an invalid certificate is not yet found), the document verification apparatus 1002 advances to a process of confirming validity of the certificate in step S714. On the other hand, if the certificate flag is turned off (i.e., if the signature including an invalid certificate is already found), the document verification apparatus 1002 skips the certificate validity confirmation process and advances the processing to step S717. Thus, if the signature including an invalid certificate is already found, the confirmation as to whether the certificate for the current signature is valid or invalid (i.e., the certificate validity confirmation process) is skipped. The reason is that if the signature including an invalid certificate is already found, the verification process for the relevant electronic document necessarily provides the result "certificate is invalid", and the final document verification result is not changed even when one or more other certificates are valid.

If the certificate flag is turned on (i.e., if the signature including an invalid certificate is not yet found), the document verification apparatus 1002 confirms validity of the certificate contained in the n-th signature (S714).

When the n-th signature is not a time stamp signature, details of the process executed in step S714 are similar to those of the certificate validity confirmation process shown in FIG. 6A. The difference therebetween is that the process in FIG. 6A is executed by the document registration apparatus 1001, while the process in step S714 is executed by the document verification apparatus 1002. Further, with the process in FIG. 6A, the state of the certificate is always made invalid if the valid term of the certificate is expired at the time when the validity of the certificate is confirmed. In the process in step S714, however, even if the valid term of the certificate is expired at the time when the validity of the certificate is confirmed, the state of the certificate is made valid in the case where the time stamp signature has been put before the valid term of the certificate is expired.

When the n-th signature is a time stamp signature, details of the process executed in step S714 are as follows. Based on the valid term specified in the time stamp token contained in the time stamp signature, the document verification apparatus 1002 determines whether the time stamp signature is valid. On that occasion, even if the time stamp signature is not within the valid term specified in the time stamp token, the state of the certificate is made valid in the case where another time stamp signature has been put before the valid term of the certificate is expired.

Next, the document verification apparatus 1002 determines whether the certificate validity confirmation result is valid (S715). If the certificate validity confirmation result is valid, the document verification apparatus 1002 advances the processing to step S717. If the certificate validity confirmation result is invalid, the document verification apparatus 1002 turns off the certificate confirmation flag (S716) and advances the processing to step S717. Herein, turning off the certificate confirmation flag if the certificate validity confirmation result is invalid means that validity of the certificate, which is affixed to the signature to be next verified (i.e., the (n−1)-th signature), is no longer required to be confirmed. The reason is that if the presence of an invalid certificate is found, the verification process for the relevant electronic document necessarily provides the result "there is an invalid certificate", and the final document verification result is not changed even when one or more other certificates are valid.

Next, the document verification apparatus 1002 determines the state of the editing flag (S717). If the editing flag is turned on, the document verification apparatus 1002 advances to a process of confirming editing made after the signature in step S718. If the editing flag is turned off (i.e., if any edit information is already found), the document verification apparatus 1002 skips the process of confirming editing made after the signature and brings the processing to an end. The following is the reason why the process of confirming editing made after the signature is skipped if the editing flag is turned off. If any edit information is already found, the verification process for the relevant electronic document necessarily provides the result "editing is made after signature", and the final document verification result is not changed regardless of whether other edit information is found later.

If the editing flag is turned on (i.e., if any edit information is not yet found), the document verification apparatus 1002 executes a process of confirming whether editing is made on the original document after the n-th signature (S718). For example, looking at the edit information in the electronic document shown in FIG. 11B, when the signature being verified at that time is Signature 2, the determination result indicates that editing is made on the original document. On the other hand, when the signature being verified at that time is Signature 3, the determination result indicates that editing is not made on the original document. This is because the document verification apparatus 1002 executes, in step S718, the process of confirming whether editing is made after the target signature.

Based on the above-described confirmation result, the document verification apparatus 1002 determines whether editing is made after the signature (S719). If no editing is determined, the document verification apparatus 1002 brings the processing to an end. If editing is made, it turns off the editing confirmation flag and brings the processing to an end. Herein, turning off the editing confirmation flag means that the determination as to whether there is edit information is no longer required to be executed for the subsequent signature (i.e., the (n−1)-th signature). The reason is that if any edit information is already found, the verification process for the relevant electronic document necessarily provides the result "editing is made after signature", and the final document verification result is not changed regardless of whether other edit information is found later.

Figure 10C:
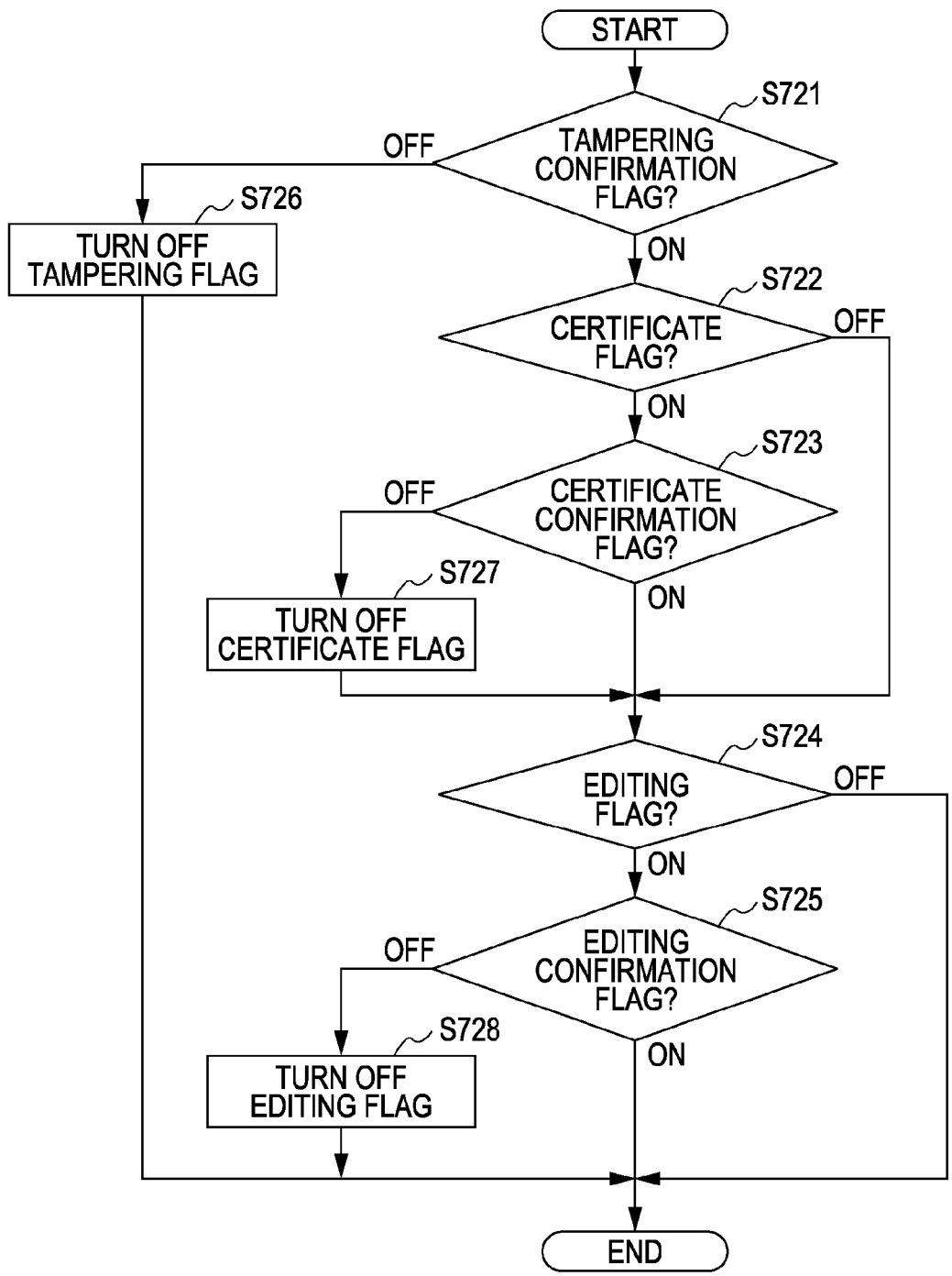
FIG. 10C is a flowchart showing details of a verification result integrating process.

FIG. 10C is a flowchart showing details of the verification result integrating process (S704). This process updates the states of the tampering flag, the certificate flag, the editing confirmation flag based on the turning-on/off of the tampering confirmation flag, the certificate confirmation flag, and the editing confirmation flag.

First, the document verification apparatus 1002 determines the tampering confirmation flag (S721). If the tampering confirmation flag is turned off, the document verification apparatus 1002 turns off the tampering flag (S726) and brings the verification result integrating process to an end. In other words, if there is information indicating that confirmation of tampering is no longer required (i.e., if the tampering confirmation flag is turn off), information indicating that tampering is already confirmed is provided (i.e., the tampering flag is turned off).

If the tampering confirmation flag is turned on (i.e., if there is information indicating that confirmation of tampering is required after that time), the document verification apparatus 1002 determines the certificate flag (S722). The turning-off of the certificate flag at that time means that the certificate contained in any of the (n+1)-th and other signatures assigned with larger numbers is invalid. Therefore, the document verification apparatus 1002 determines that the process of determinint validity of the certificate contained in the n-th signature is meaningless. Hence it advances the processing to step S724 without determining the certificate confirmation flag.

If the certificate flag is turned on, the document verification apparatus 1002 determines the certificate confirmation flag that indicates the verification result of the certificate contained in the n-th signature (S723). If the certificate confirmation flag is turned off, the certificate flag is turned off (S727).

Next, the document verification apparatus 1002 determines the editing flag (S724). The turning-off of the editing flag at that time means that editing is made after any of the (n+1)-th and other signatures assigned with larger numbers. Therefore, the document verification apparatus 1002 determines that the process of determining whether editing is made after the n-th signature is meaningless. Hence it brings the verification result integrating process to an end without determining the editing confirmation flag.

Further, if the editing flag is turned on, the document verification apparatus 1002 determines the editing confirmation flag that indicates whether editing is made after the n-th electronic signature (S725). If the editing confirmation flag is turned off, the document verification apparatus 1002 turns off the editing flag (S728) and brings the verification result integrating process to an end.

Verification Result Display Screen

Figure 12:
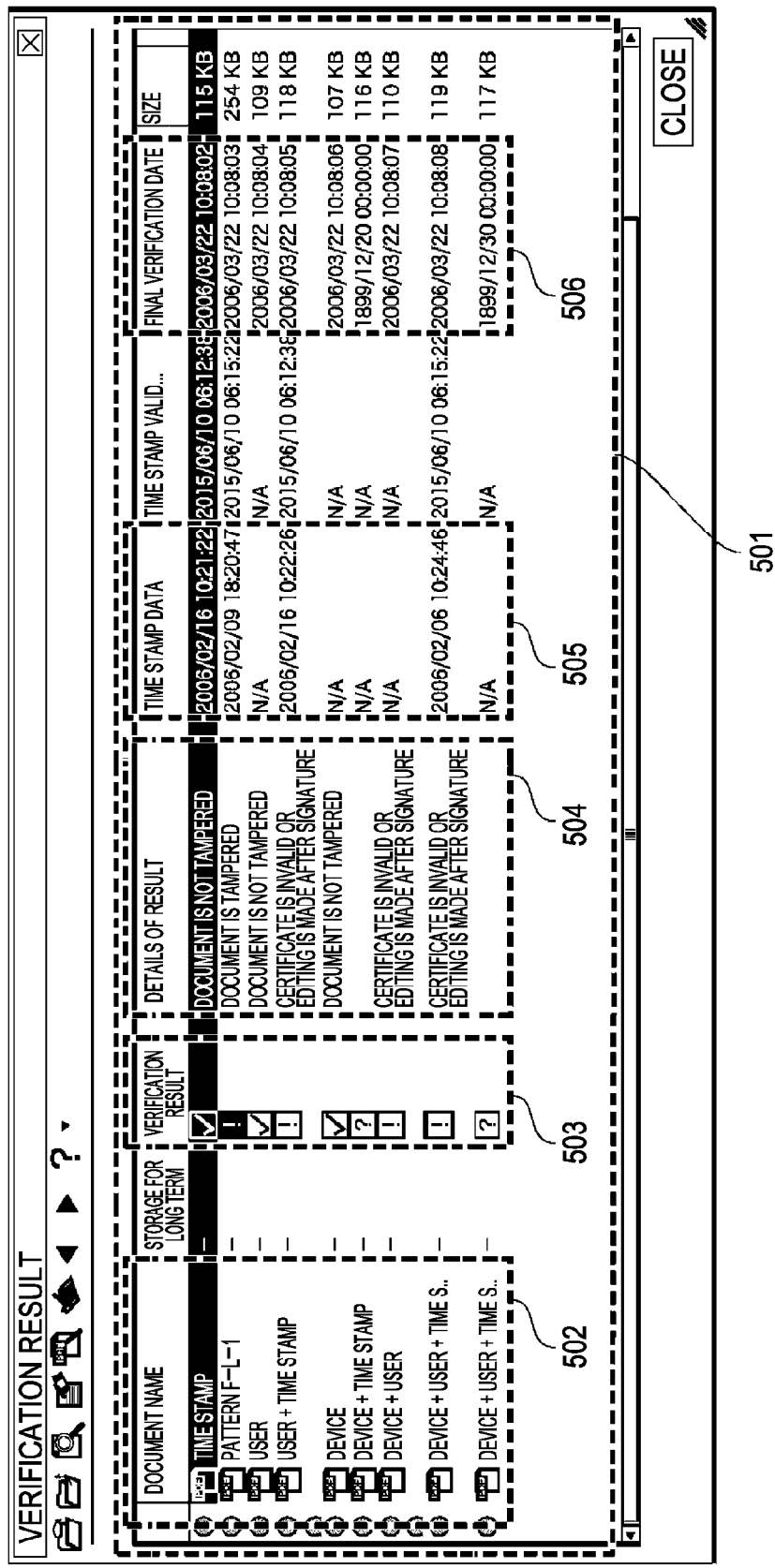
FIG. 12 shows details of a verification result dialog shown in FIG. 9C.

FIG. 12 shows details of the verification result dialog shown in FIG. 9C. In other words, the verification result dialog is a dialog displayed by the document verification apparatus 1002 after the verification process.

A verification result display area 501 of the verification result dialog includes at least the following display areas.

A display area 502 displays the document name of each electronic document.

An icon display area 503 displays the result of the verification process for each electronic document by using icons. The icons include a check mark "✓" icon indicating that the electronic document is valid, an exclamation mark "!" icon indicating that the electronic document is not tampered, but it has other problem than tampering, a reversed exclamation mark "!" icon indicating that the electronic document is tampered, and a question mark "?" icon indicating that the electronic document is not yet verified.

The check mark "✓" icon is displayed for the electronic document which has been determined to be valid in the verification process of FIG. 1A, i.e., the electronic document for which the tampering flag, the certificate flag, and the editing flag are all held turned on.

The exclamation mark "!" icon is displayed for the electronic document for which the verification process of FIG. 10A has determined that editing is made or the certificate is invalid, i.e., the electronic document for which the certificate flag or the editing flag is turned off.

The reversed exclamation mark "!" icon is displayed for the electronic document for which the verification process of FIG. 10A has determined that it is tampered, i.e., the electronic document for which the tampering flag is turned off.

The question mark "?" icon is displayed for the electronic document for which the verification process of FIG. 10A is not yet executed.

A display area 504 displays details of the verification result. FIG. 12 shows an example in which, if one of the certificate flag and the editing flag is turned off, details of the verification result are displayed by a message, e.g., "certificate is invalid or editing is made after signature". However, the display can be modified such that messages, e.g., "certificate is invalid" and "editing is made after signature", are displayed depending on the states of the certificate flag and the editing flag, respectively.

A display area 505 displays the date and time of the addition of the time stamp signature. Following the display area 505, the data and time indicating the validity term of the time stamp signature are displayed.

A display area 506 displays the date and time of the final verification, i.e., the latest date and time among the dates and times of the verifications performed on the electronic document.

Thus, in the first exemplary embodiment, when it is determined that the signature is tampered, the process of confirming the certificate included in the relevant signature and the process of confirming whether editing is made after the relevant signature are not executed. Also, the process of verifying the signature(s) added to the electronic document before the tampered signature (i.e., the process of detecting tampering, the process of confirming the certificate, and the process of confirming whether editing is made) are not executed at all. The reason is that if tampering is detected, the verification result of the relevant electronic document is necessarily given by "document is tampered" and is never changed.

Also, in the first exemplary embodiment, if it is determined that the certificate contained in the signature is invalid, the process of confirming whether the certificate contained in the other signature (i.e., the (n−1)-th signature) added before the relevant signature is invalid is not executed. The reason is that if the presence of an invalid certificate is found, the verification result of the relevant electronic document is not changed even when one or more other certificates are valid. However, even if it is determined that the certificate contained in the signature is invalid, the process of confirming tampering on the signature added before the relevant signature, which contains the invalid certificate, is executed. The reason is that if tampering is found, the verification result of the relevant electronic document is changed from "certificate is invalid" to "document is tampered".

Stated another way, in the first exemplary embodiment, tampering is regarded as a more serious problem than the case where the certificate is invalid. To make the user recognize the tampering as being a more serious problem, even when it is determined that the certificate contained in the signature is invalid, the process of confirming tampering for one or more other signatures, which have been added before the signature containing the invalid certificate, is executed without interrupting it.

Further, in the first exemplary embodiment, if it is determined that editing is made after the signature, the process of confirming whether editing is made after the other signature (i.e., the (n−1)-th signature) added before the relevant signature is not executed. The reason is that if editing after the signature is found, the verification result of the relevant electronic document is not changed even when editing is not made after one or more other signatures. However, even if it is determined that editing is made after the signature, the process of confirming tampering on the signature added before the relevant signature, which contains the invalid certificate, is executed. The reason is that if tampering is found, the verification result of the relevant electronic document is changed from "editing is made after signature" to "document is tampered".

Stated another way, in the first exemplary embodiment, tampering is regarded as a more serious problem than editing made after the signature. To make the user recognize the tampering as being a more serious problem, even when it is determined that editing is made after the signature, the process of confirming tampering for one or more other signatures, which have been added before the relevant signature, is executed without interrupting it.

In the first exemplary embodiment, as described above, the verification time is cut by omitting the unnecessary processes.

Second Exemplary Embodiment

Information processing according to a second exemplary embodiment of the present invention will be described below. Note that substantially similar components in the second exemplary embodiment to those in the first exemplary embodiment are denoted by the same reference characters and a detailed description of those components is not repeated here.

The second exemplary embodiment is directed to a method of, when the document management server 1003 stores a large number of electronic documents each including a plurality of signatures, enabling the document verification apparatus 1002 to obtain the verification result at a higher speed.

Certificate Management Table

The document registration apparatus 1001 is able to not only add a signature to an electronic document and register the electronic document added with the signature in the document management server 1003, but also register an electronic document in the document management server 1003 without adding a signature. Further, an electronic document can be added with one or more signatures in advance.

At the time of registering an electronic document, the document management server 1003 extracts respective certificates for individual signatures contained in the electronic document, and it prepares a certificate management table which describes the correspondent relationship between a document file and the extracted certificates. Instead of the document management server 1003, the document registration apparatus 1001 can also prepare a certificate management table and store it in the document management server 1003.

FIG. 2 shows one example of the configuration of the certificate management table. The certificate management table has a certificate field 2001, a certificate status field 2002 indicating the verification status of each certificate, and a certificate-using document field 2003 in which is recorded each electronic document including the signature given with the corresponding certificate.

In the certificate status field 2002, "valid" is recorded for the certificate which has been determined to be valid, and "invalid" is recorded for the certificate which has been determined to be invalid. Further, "not yet verified" is recorded for the certificate which is not yet subjected to verification. FIG. 2 shows an example in which certificates A and D are not yet verified, a certificate B is valid, and a certificate C is invalid.

When a plurality of electronic documents are signed using the same certificate, respective file names of the plurality of electronic documents are recorded in the certificate-using document field 2003 corresponding to that certificate.

Assume, by way of example, the case in which an electronic document X including two signatures is registered in the document management server 1003 by the document registration apparatus 1001. It is also assumed that one signature employs the certificate A and the other signature employs the certificate D.

In that case, since the certificate A is already registered in the certificate management table, the document management server 1003 adds the file name of the electronic document X in a cell of the certificate-using document field 2003 corresponding to the certificate A. On the other hand, if the certificate D is not yet registered, the document management server 1003 newly prepares a record for the certificate D and records the file name of the electronic document X in a cell of the certificate-using document field 2003 corresponding to the certificate D.

Determination as to Necessity of Certificate Verification

Figure 13:
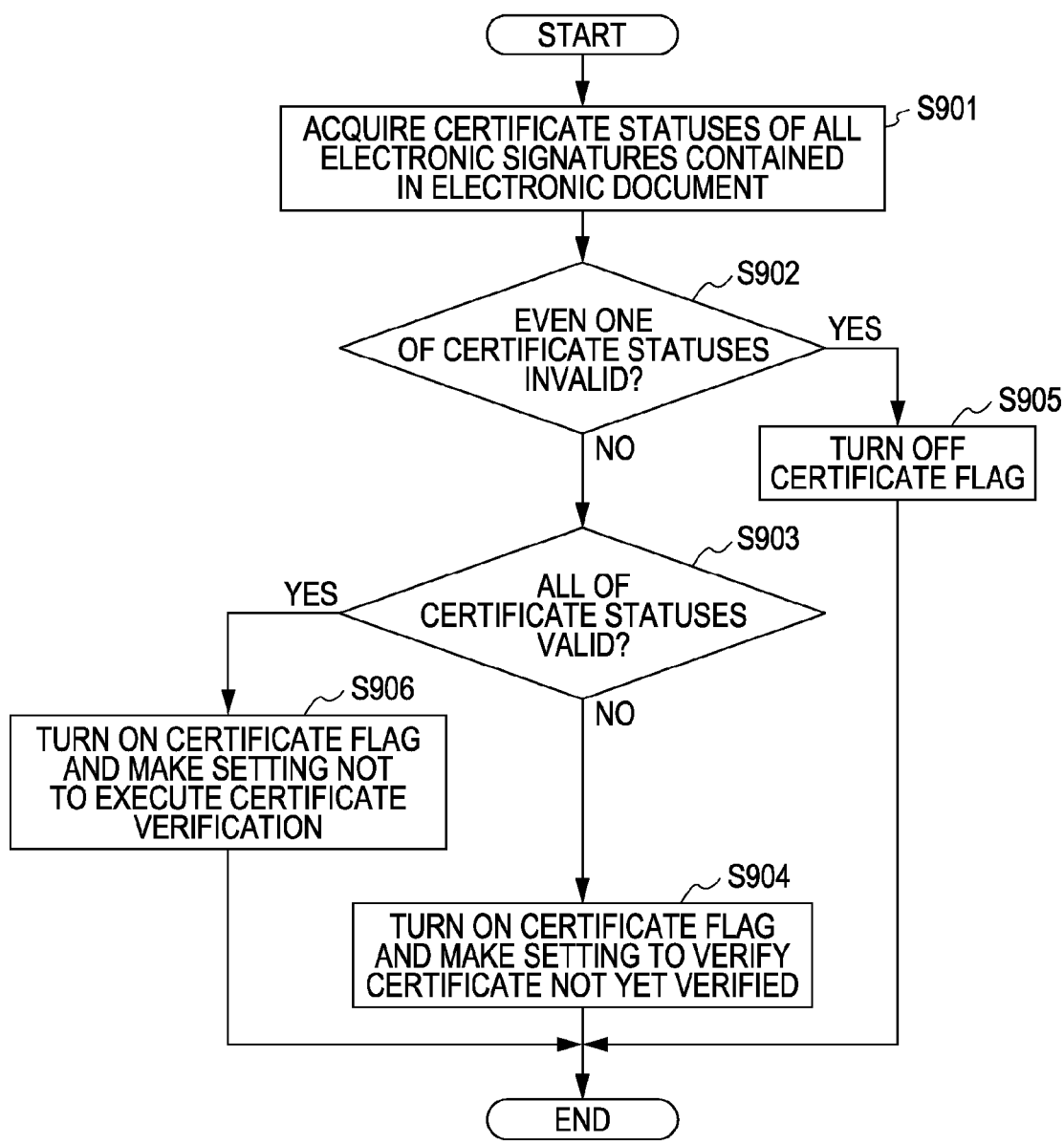
FIG. 13 is a flowchart showing determination as to whether a certificate is required to be verified.

Based on the certificate management table, the document verification apparatus 1002 determines whether validity of the certificate for the signature contained in the verification target document is required to be verified. FIG. 13 is a flowchart showing the determination as to whether the certificate is required to be verified.

The document verification apparatus 1002 acquires, from the certificate management table, the verification statuses of the certificates for all the signatures contained in the verification target document (S901). Then, the document verification apparatus 1002 determines whether "invalid" is included in even one of the acquired certificate statuses (S902). If the invalid certificate status is included, the document verification apparatus 1002 turns off the certificate flag and makes setting not to execute the certificate verification (S905). Thereafter, the processing is brought to an end.

On the other hand, if "invalid" is not included in all the acquired certificate statuses, the document verification apparatus 1002 determines whether all the acquired certificate statuses are valid (S903). If all the certificate statuses are valid, the document verification apparatus 1002 turns on the certificate flag and makes setting not to execute the certificate verification (S906). Thereafter, the processing is brought to an end.

If "not yet verified" is included in the acquired certificate statuses, the document verification apparatus 1002 turns on the certificate flag and makes setting to verify the certificate not yet verified (S904). Thereafter, the processing is brought to an end.

In the above description, whether the certificate status is valid or invalid is determined. For the validity of the certificate, however, there is a possibility that the validity of the certificate cannot be always verified depending on a time lag from the verification of the certificate to the acquisition of the certificate status from the certificate management table. Taking into account such a possibility, the determination can be performed as to only invalidity of the certificate status without determining validity thereof. In that case, in FIG. 13, if the determination in step S902 indicates that "invalid" is not included in even one of the certificate statuses, the document verification apparatus 1002 turns on the certificate flag in step S904 without executing step S903. Thereafter, the processing is brought to an end. As an alternative method, the data and time of the certificate verification can be recorded in the certificate management table such that the determination as to the validity of the certificate status is performed if the data and time of the certificate verification falls within a predetermined range of time.

FIG. 14 shows one practical example of a table resulting from the determination as to whether the certificate is to be verified.

It is now assumed that the state of the certificate management table prior to start of the determination is as per shown in FIG. 2 and the verification is executed in the order of electronic documents M and X. The verification of other electronic documents is not described here on an assumption that those electronic documents are verified after the electronic document X.

As seen from the certificate management table, the electronic document M uses only the certificate A and the status of the certificate A is not yet verified (see FIG. 2). Accordingly, the document verification apparatus 1002 executes the verification of the certificate A in the process of verifying the electronic document M. If the verification result of the certificate A is "invalid", the document verification apparatus 1002 updates the certificate management table to the state shown in FIG. 14.

Next, the document verification apparatus 1002 verifies the electronic document X. As seen from the certificate management table, the electronic document X uses the certificates A and D. At this point in time, the status of the certificate A is invalid (see FIG. 14). Therefore, the document verification apparatus 1002 turns off the certificate flag for the verification of the electronic document S such that the certificate verification for the electronic document X is not executed.

Thus, by updating the certificate management table during the verification process of each electronic document, whether the certification verification is required or not can be determined prior to start of the verification of the target electronic document. As a result, the unnecessary certificate verification process can be omitted and the verification time required to verify a large number of documents can be cut correspondingly.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2006-314811 filed Nov. 21, 2006, which is hereby incorporated by reference herein in its entirety.

What is claimed is:

1. An apparatus, comprising:
    a first verification unit configured to verify a first signature added to an electronic document to produce a first verification result;
    a second verification unit configured to verify, after verification of the first signature by the first verification unit, a second signature added to the electronic document before the first signature to produce a second verification result, wherein
    (i) if the first verification unit determines that the electronic document has been edited but not been tampered after addition of the first signature, the second verification unit does not execute a process of determining whether the electronic document has been edited after addition of the second signature but executes a process of determining whether the electronic document has been tampered after addition of the second signature,
    (ii) if the first verification unit determines that the electronic document has not been edited and has not been tampered after addition of the first signature, the second verification unit executes a process of determining whether the electronic document has been edited after addition of the second signature and determining whether the electronic document has been tampered after addition of the second signature,
    (iii) if the first verification unit determines that the electronic document has been tampered after addition of the first signature, the second verification unit does not execute a process of determining whether the electronic document has been edited after addition of the second signature and does not execute a process of determining whether the electronic document has been tampered after addition of the second signature;
    a verification integrating unit configured to decide a verification result of the electronic document by using the first verification result and the second verification result; and
    a central processing unit configured to control at least one of the first verification unit, the second verification unit, and the verification integrating unit.

2. A method for an apparatus, the method comprising:
    verifying a first signature added to an electronic document to produce a first verification result;
    verifying, after verifying the first signature, a second signature added to the electronic document before the first signature to produce a second verification result, wherein
    (i) if verifying the first signature determines that the electronic document has been edited but not been tampered after addition of the first signature, verifying the second signature does not execute a process of determining whether the electronic document has been edited after addition of the second signature but executes a process of determining whether the electronic document has been tampered after addition of the second signature,
    (ii) if verifying the first signature determines that the electronic document has not been edited and has not been tampered after addition of the first signature, verifying the second signature executes a process of determining whether the electronic document has been edited after addition of the second signature and determining whether the electronic document has been tampered after addition of the second signature,
    (iii) if verifying the first signature determines that the electronic document has been tampered after addition of the first signature, verifying the second signature does not execute a process of determining whether the electronic document has been edited after addition of the second signature and does not execute a process of determining whether the electronic document has been tampered after addition of the second signature; and
    deciding, using a central processing unit, a verification result of the electronic document by using the first verification result and the second verification result.

3. A non-transitory computer-readable medium storing a program causing an apparatus to perform a method according to claim 2.

* * * * *